US011675901B2

(12) United States Patent
Kumar et al.

(10) Patent No.: US 11,675,901 B2
(45) Date of Patent: Jun. 13, 2023

(54) MALWARE DETECTION FROM OPERATING SYSTEM EVENT TRACING

(71) Applicant: McAfee, LLC, San Jose, CA (US)

(72) Inventors: Amit Kumar, Bangalore (IN); Prashanth Palasamudram Ramagopal, Portland, OR (US); German Lancioni, San Jose, CA (US)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 17/131,421

(22) Filed: Dec. 22, 2020

(65) Prior Publication Data

US 2022/0198011 A1    Jun. 23, 2022

(51) Int. Cl.
*G06F 21/56* (2013.01)
*G06F 21/53* (2013.01)
*G06F 21/54* (2013.01)
*G06F 21/55* (2013.01)
*G06F 18/22* (2023.01)

(52) U.S. Cl.
CPC ............ *G06F 21/564* (2013.01); *G06F 18/22* (2023.01); *G06F 21/53* (2013.01); *G06F 21/54* (2013.01); *G06F 21/554* (2013.01); *G06F 21/566* (2013.01)

(58) Field of Classification Search
CPC ........ G06F 21/564; G06F 21/53; G06F 21/54; G06F 21/554; G06F 21/566; G06K 9/6215
See application file for complete search history.

(56) References Cited

U.S. PATENT DOCUMENTS

| 2006/0161984 | A1* | 7/2006 | Phillips | G06F 21/564 |
| | | | | 713/188 |
| 2008/0127336 | A1* | 5/2008 | Sun | G06F 21/566 |
| | | | | 726/22 |
| 2011/0047620 | A1* | 2/2011 | Mahaffey | G06F 21/564 |
| | | | | 726/22 |
| 2013/0145472 | A1* | 6/2013 | Ramabhatta | H04L 63/145 |
| | | | | 726/25 |
| 2014/0380473 | A1* | 12/2014 | Bu | G06F 21/566 |
| | | | | 726/23 |
| 2015/0096018 | A1* | 4/2015 | Mircescu | G06F 21/56 |
| | | | | 726/23 |
| 2016/0085970 | A1* | 3/2016 | Rebelo | G06F 21/554 |
| | | | | 726/25 |
| 2018/0096149 | A1* | 4/2018 | Morkovsky | G06F 21/566 |
| 2018/0316699 | A1* | 11/2018 | David | G06F 21/552 |
| 2021/0064745 | A1* | 3/2021 | Bouguerra | G06F 21/567 |
| 2021/0141897 | A1* | 5/2021 | Seifert | G06F 9/54 |
| 2021/0304013 | A1* | 9/2021 | Zhang | G06N 20/20 |
| 2022/0019665 | A1* | 1/2022 | Perry | G06K 9/6215 |

* cited by examiner

*Primary Examiner* — Trong H Nguyen
(74) *Attorney, Agent, or Firm* — Patent Capital Group

(57) ABSTRACT

There is disclosed in one example a computing apparatus, including: a hardware platform including a processor and a memory; and instructions encoded within the memory to instruct the processor to: receive a client event report, the client event report including an operating system event trace for an attempt to exploit a patched vulnerability, and first feature data for a malware object that made the attempt; receive second feature data for an unknown object; compare the first feature data to the second feature data; and if the second feature data match the first feature data above a threshold, convict the unknown object as malware.

20 Claims, 18 Drawing Sheets

MALWARE DETECTION FROM OPERATING SYSTEM EVENT TRACING

FIELD OF THE SPECIFICATION

This application relates in general to computer security, and more particularly, though not exclusively, to a system and method for providing malware detection from operating system event tracing.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
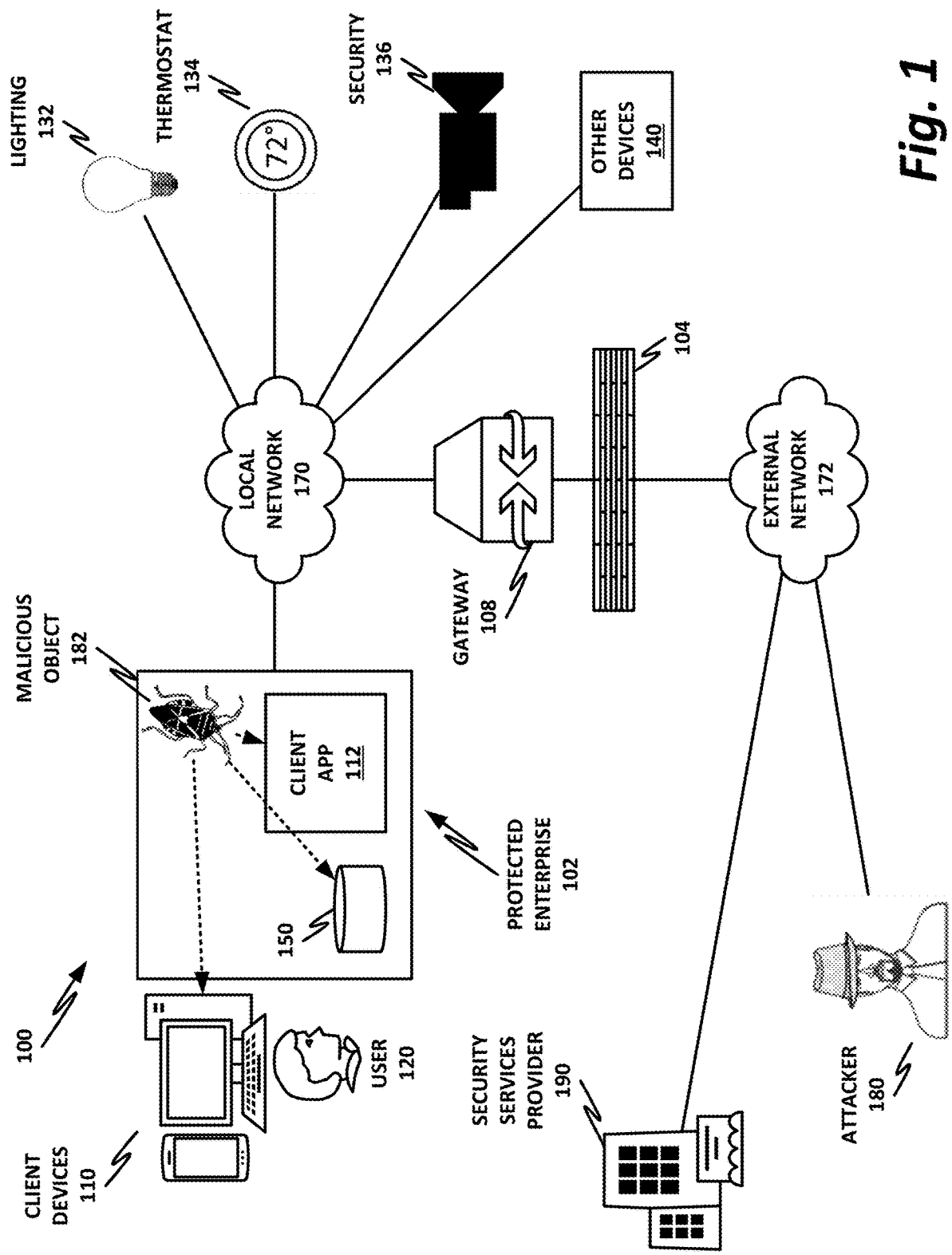
FIG. 1 is a block diagram illustration of selected elements of a computer security ecosystem.

In an example, there is disclosed a computing apparatus, comprising: a hardware platform comprising a processor and a memory; and instructions encoded within the memory to instruct the processor to: receive a client event report, the client event report including an operating system event trace for an attempt to exploit a patched vulnerability, and first feature data for a malware object that made the attempt; receive second feature data for an unknown object; compare the first feature data to the second feature data; and if the second feature data match the first feature data above a threshold, convict the unknown object as malware.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

An important function for security services vendors is detecting new vulnerabilities and new attack methods. This can be particularly important for large industry or enterprise clients with sensitive data. These could include, for example, banking, government, finance, law, healthcare, and education, by way of illustrative and nonlimiting example. These industries may need to safeguard network data and infrastructure, while also maintaining responsive and useful networks.

In an illustrative use case, it may take weeks to patch all endpoint systems after the discovery or disclosure of a vulnerability. This time gap can make an enterprise network vulnerable to attack. In some cases, one or more endpoints may be left unpatched for a nontrivial period of time, which means that these endpoints are susceptible to an eventual exploit. Thus, it is advantageous to proactively detect and remediate any threats arising from these vulnerabilities, and to detect and remediate new attack methods. The present specification provides a cloud native solution for performing this task. Specifically, the specification provides a mechanism to improve the conviction rate of samples that are unknown, based on their similarity to other samples that have been observed attempting to exploit vulnerabilities in other endpoints. When an exploit attempts to use a vulnerability on a patched endpoint, the endpoint may raise an operating system event with, for example, a common vulnerabilities and exposures (CVE) number. These events can be reported to a cloud server, which can keep a list of such events. If an unknown object is later discovered on the network, then the object can be compared to a list of known objects that attempted to exploit a security vulnerability. By its similarity to these known objects, the new unknown object can then be convicted.

This solution takes advantage of a pattern with malware. Historically, malware objects tend to exploit known vulnerabilities to infect devices and accomplish malicious activity. For example, there was a recent major attack of this type using the vulnerability CurveBall, specifically CVE-2020-0601.

It can take some matter of time, for example several weeks, to patch all endpoint systems in an enterprise. And sometimes, one or more endpoints are not patched at all, because they require backward compatibility, or have some other special requirement. If there is a newly encountered object, it is possible for this to be a malware object that avoids detection, either because of its unique signature, or because machine learning models were not able to convict it. However, the malware may be exploiting the same known vulnerabilities that other malware objects have exploited in the past. A system and method as described herein may leverage specific event tracing for Windows (ETW) events to detect malware that tries to exploit patched systems. The system may extract properties of the malware to be consumed, for example, by a cloud service. These properties could include, for example, a hash, metadata about the object, static analysis properties, results of dynamic analysis, or an image file based on the object to be used by a computer vision machine learning system. In other examples, the binary object itself could be uploaded to the cloud service.

Notably, on patched endpoints, the malware object will not be successful in its exploit. However, on unpatched endpoints, the malware object may be able to perform useful work. When a malware object attempts to execute, malware features may be extracted and sent back to the cloud service. If the features match or are sufficiently similar to earlier received data (i.e., objects that were convicted because they attempted to take advantage of a known exploit), then the new object may be convicted based on this similarity.

This provides the ability to detect new, never-before-seen malware based on a combination of static feature vector similarities. This can be aided by the exploitability detection event that may occur on an already-patched system.

This may supplement and/or replace some existing systems. For example, some systems rely on a feature vector that is captured from the malware (i.e., static analysis) in isolation. This means that the object is captured on a given system, independently of other systems. While this provides some utility, the teachings of the present specification can supplement this detection by comparing unknown objects to other, known objects that were convicted based on their attempts to exploit a known vulnerability.

Operating systems, such as Microsoft Windows and others, may provide a feature for publishing events when an attempted security vulnerability exploit is detected. For example, in Windows, this is called CveEventWrite. The present specification extends existing malware detection mechanisms to include a register for this specific type of event. By registering these operating system detection events, the objects that attempted the exploit can be convicted as malware. Features of those objects can then be extracted, such as static features, metadata, a hash, or a grayscale image taken by converting the binary object to a square, optionally compressing the square, and then treating the resulting binary object as a grayscale image that can be analyzed by a computer vision system.

By characterizing objects that have been convicted based on their attempts to exploit a known vulnerability, it is possible to identify other programs or samples that are trying to make use of known vulnerabilities. By using the attempted exploit event as a trigger, features can be extracted for any process (e.g., a portable executable) that made use of the known vulnerability. Upon receiving the sample features from the endpoint, along with the vulnerability that the program tried to exploit, the system can correlate unknown objects to those features. These unknown objects may be encountered, for example, on unpatched systems that would not catch the vulnerability if an attempt were made to exploit it. However, these unpatched systems may have similar features, such as a similar operating system, similar installed software, or other similarities that make a comparison between the systems useful.

Features extracted from an unknown object can be compared to features of known, convicted objects that attempted to exploit vulnerabilities. The unknown objects can then be convicted as malware, and as trying to exploit a vulnerability, based on their similarity to the known or previously detected objects. Thus, these objects can be detected even when the system is unable to raise a CveEventWrite, either because the operating system doesn't support it, or because the system is still unpatched.

The foregoing can be used to build or embody several example implementations, according to the teachings of the present specification. Some example implementations are included here as nonlimiting illustrations of these teachings.

There is disclosed in one example a computing apparatus, comprising: a hardware platform comprising a processor and a memory; and instructions encoded within the memory to instruct the processor to: receive a client event report, the client event report including an operating system event trace for an attempt to exploit a patched vulnerability, and first feature data for a malware object that made the attempt; receive second feature data for an unknown object; compare the first feature data to the second feature data; and if the second feature data match the first feature data above a threshold, convict the unknown object as malware.

There is further disclosed an example computing apparatus, wherein the instructions provide a container.

There is further disclosed an example computing apparatus, wherein the instructions provide a virtual machine, including a virtual processor.

There is further disclosed an example computing apparatus, wherein the instructions are further to determine that the second feature data do not match the first feature data above the threshold, and to mark the unknown object for additional analysis.

There is further disclosed an example computing apparatus, wherein the first and second feature data comprise static features.

There is further disclosed an example computing apparatus, wherein the first and second feature data comprise dynamic analysis features.

There is further disclosed an example computing apparatus, wherein the instructions are further to provide an artificial intelligence engine.

There is further disclosed an example computing apparatus, wherein the feature data comprise an image file derived from the unknown object.

There is further disclosed an example computing apparatus, wherein the feature data comprise a binary image of the unknown object.

There is further disclosed an example computing apparatus, wherein the instructions are to receive first feature data for a set of a plurality of known objects, and second feature data for a set of unknown objects.

There is further disclosed an example computing apparatus, wherein comparing the first feature data to the second feature data comprises querying a MinHash locality sensitive hashing forest based on Jaccard-compatible features, and selecting a subset of most-similar samples by computing a total distance from non-Jaccard-compatible sub-distances.

There is also disclosed an example of one or more tangible, non-transitory computer-readable storage media having stored thereon executable instructions to: allocate a first data store and populate the first data store with first feature data for a plurality of objects convicted as malware according to their attempt to exploit patched security vulnerabilities; allocate a second data store and populate the second data store with second feature data for a plurality of objects with unknown reputations; and assign reputations to the second plurality of objects according to their similarity to individual objects selected from the first plurality of objects.

There is further disclosed an example of one or more tangible, non-transitory computer-readable storage media, wherein the instructions are further to provide a container.

There is further disclosed an example of one or more tangible, non-transitory computer-readable storage media, wherein the instructions are further to provide a virtual machine, including a virtual processor.

There is further disclosed an example of one or more tangible, non-transitory computer-readable storage media, wherein the instructions are further to determine that the second feature data do not match the first feature data above a threshold, and to mark the objects with unknown reputations for additional analysis.

There is further disclosed an example of one or more tangible, non-transitory computer-readable storage media, wherein the first and second feature data comprise static features.

There is further disclosed an example of one or more tangible, non-transitory computer-readable storage media, wherein the first and second feature data comprise dynamic analysis features.

There is further disclosed an example of one or more tangible, non-transitory computer-readable storage media, wherein the instructions are further to provide an artificial intelligence engine.

There is further disclosed an example of one or more tangible, non-transitory computer-readable storage media, wherein the feature data comprise an image file derived from the objects.

There is further disclosed an example of one or more tangible, non-transitory computer-readable storage media, wherein the feature data comprise binary images of the unknown objects.

There is further disclosed an example of one or more tangible, non-transitory computer-readable storage media, wherein the instructions are further to receive first feature data for a set of a plurality of known objects, and second feature data for a set of unknown objects.

There is further disclosed an example of one or more tangible, non-transitory computer-readable storage media, wherein comparing the first feature data to the second feature data comprises querying a MinHash locality sensitive hashing forest based on Jaccard-compatible features, and selecting a subset of most-similar samples by computing a total distance from non-Jaccard-compatible sub-distances.

There is also disclosed an example computer-implemented method of analyzing a set of unknown binary objects, comprising: convicting a first set of objects as malware according to their attempt to exploit patched vulnerabilities on endpoint devices; collecting first feature data for the first set of objects in a first data store; collecting second feature data for a second set of unknown objects; and for objects in the second set, finding a most-similar object in the first set, and assigning the objects in the second set reputations according to a degree of similarity.

There is further disclosed an example method, further comprising providing instructions to a processor to provide a container.

There is further disclosed an example method, further comprising providing instructions to a processor to provide a virtual machine, including a virtual processor.

There is further disclosed an example method, further comprising determining that the second feature data do not match the first feature data above a threshold, and to mark the unknown binary objects for additional analysis.

There is further disclosed an example method, wherein the first and second feature data comprise static features.

There is further disclosed an example method, wherein the first and second feature data comprise dynamic analysis features.

There is further disclosed an example method, further comprising providing instructions to a processor to provide an artificial intelligence engine.

There is further disclosed an example method, wherein the first and second feature data comprise respective image files derived from the objects.

There is further disclosed an example method, wherein the first and second feature data comprise binary images of the objects.

There is further disclosed an example method, further comprising receiving first feature data for a set of a plurality of known objects, and second feature data for a set of unknown objects.

There is further disclosed an example method, wherein finding a most-similar object comprises querying a MinHash locality sensitive hashing forest based on Jaccard-compatible features, and selecting a subset of most-similar samples by computing a total distance from non-Jaccard-compatible sub-distances.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

A system and method for providing malware detection from operating system even tracing will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram illustration of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
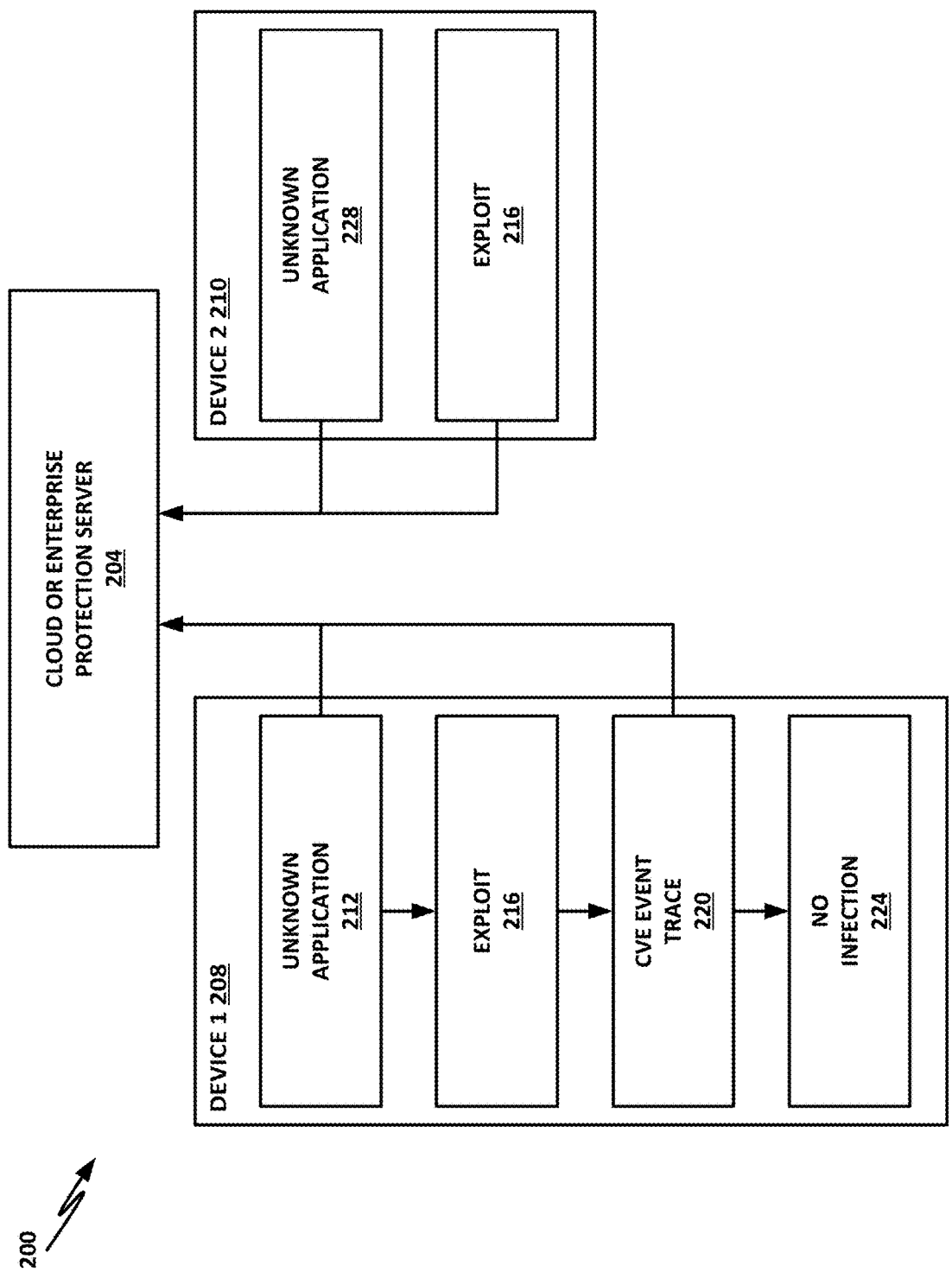
FIG. 2 is a block diagram illustration of further selected elements of a computer security ecosystem.

FIG. 2 is a block diagram illustration of selected elements of a computer security ecosystem 200. Computer security ecosystem 200 includes a protection service 204, which may be provided within the enterprise itself, or by a separate, cloud-based security services provider. In this example, ecosystem 200 includes a number of devices, including device 1 208 and device 2 210. In this illustration, device 1 208 is a patched device, while device 2 210 is an unpatched device.

In this illustration, device 1 208 encounters an unknown application 212. Unknown application 212 attempts to take advantage of an exploit 216. Exploit 216 is a known exploit, which device 1 208 is patched against. Thus, a security agent running on device 1 208 may detect the attempted exploit, or the operating system may detect the attempted exploit.

In response to the attempted exploit, device 1 208 generates a CVE event trace 220. CVE event trace 220 is provided along with feature data of unknown application 212 to protection server 204.

In block 224, there is no infection of device 1 208, because the vulnerability has been patched.

However, protection service 204 now has a useful data point. It may convict unknown application 212 as a malicious application, based on its attempt to exploit a known vulnerability. Thus, the features of unknown application 212 may be added to a database within protection server 204. This database may include unknown application 212, as well as potentially many other applications that have been encountered in a similar manner, and that have been convicted based on their attempts to exploit a known vulnerability.

Within the same or a different enterprise, device 2 210 is unpatched. Thus, device 2 210 encounters unknown application 228. Unknown application 228 attempts to take advantage of exploit 216.

Because unknown application 228 has not yet been characterized, device 2 210 may query protection server 204 for a reputation for unknown application 228. If protection server 204 does not have an existing reputation for unknown application 228, then it may need to infer a reputation based on other information. In this case, unknown application 228 may be compared to a larger set of previously convicted applications, which may have been convicted for attempting to take advantage of the same exploit 216 that unknown application 228 is also trying to take advantage of. However, because application 228 is unknown, it is not yet determined that it is, in fact, trying to take advantage of exploit 216.

After comparing unknown application 228 to a large data set of previously encountered, known applications that have been convicted, protection server 204 may determine that unknown application 228 is in fact malicious, and that it belongs to a species of malware that attempts to take advantage of exploit 216. Thus, protection server 204 may return to device 2 210 a negative reputation for unknown application 228, and appropriate security actions may be taken, such as to quarantine, remove, or otherwise mitigate unknown application 228.

Figure 3:
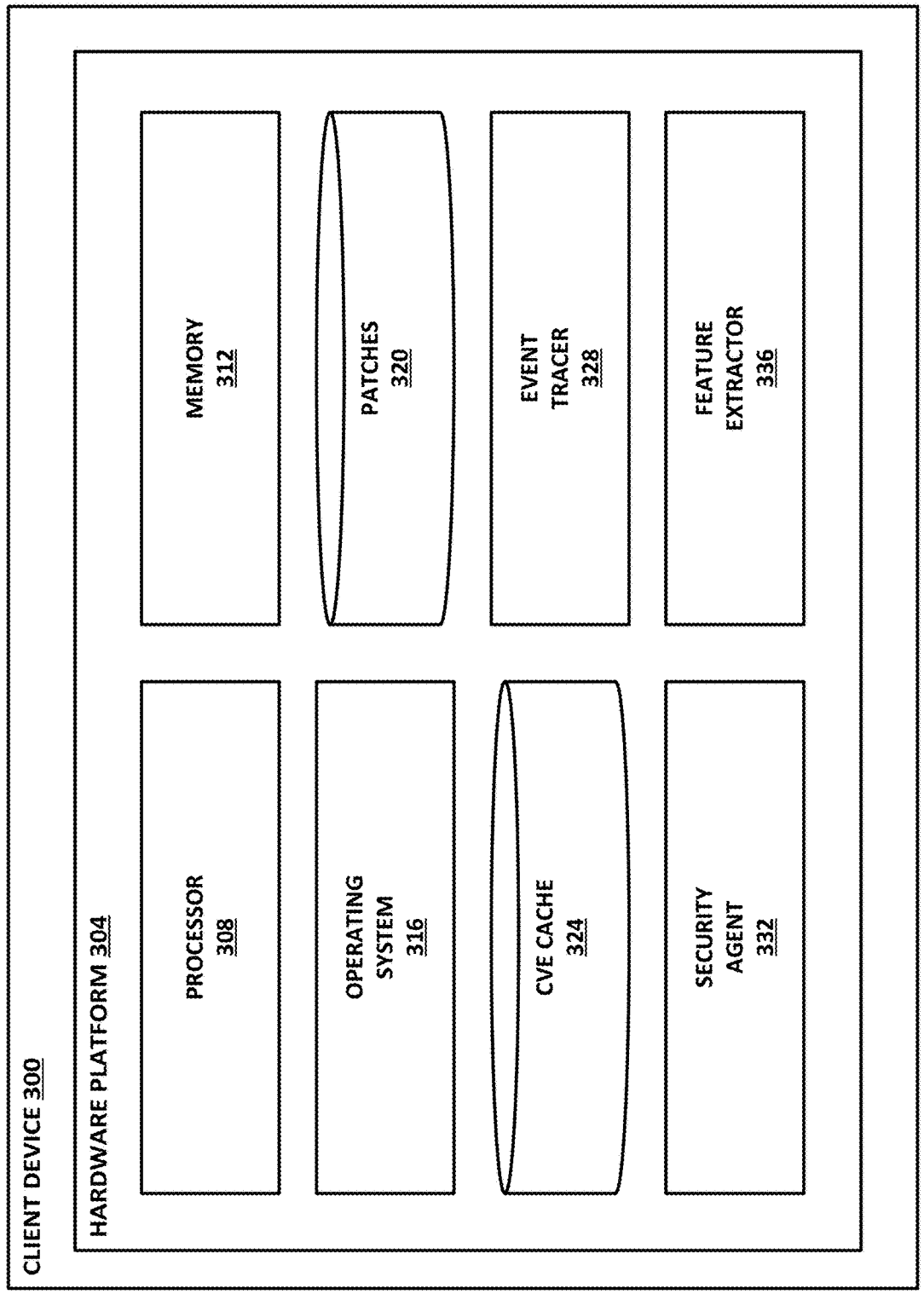
FIG. 3 is a block diagram of a client device.

FIG. 3 is a block diagram of a client device 300. Client device 300 may be, for example, an endpoint device, or other enterprise device that receives services from a security service, such as security services provider 190 of FIG. 1.

Client device 300 is based on a hardware platform 304. Hardware platform 304 includes a processor 308 and a memory 312. Examples of a hardware platform are provided in the FIGURES below.

It should be noted that processor 308 and memory 312 could also be virtualized, or otherwise the subjects of a guest infrastructure.

Client device 300 may also include an operating system 316. Operating system 316 may be configured to provide notifications of any attempt to exploit a known vulnerability. For example, operating system 316 could be a Microsoft Windows operating system that is configured to provide a CVE event trace whenever there is an attempt to exploit a known vulnerability.

Patches 320 may have been applied to operating system 316, or to user space applications, to prevent the exploit of vulnerabilities.

CVE cache 324 may include CVE identification numbers for known exploits, which can be used to assign a CVE number to a CVE event trace when there is an attempt to exploit a known vulnerability.

Event tracer 328 may be an outside or user space application, or a subsystem of operating system 316. Event tracer 328 detects any attempt to exploit a vulnerability that has been patched by one of the patches 320. When this occurs, event tracer 328 may raise an event such as a CVE event trace, and may provide metadata about the attempt.

Security agent 332 may be, for example, a user space application or a system service that consumes events raised by event tracer 328. In consuming the event, security agent 332 may provide metadata about the event, and about the object that tried to exploit the vulnerability, to a security service. As part of this consumption, feature extractor 336 may extract static, dynamic, or other features from the object that attempted to exploit the vulnerability. This could include any of the features described throughout this specification. Once the features have been extracted by feature extractor 336, security agent 332 can provide the features or other appropriate metadata to a security service, which can then use these features as a data point for convicting other unknown objects.

Figure 4:
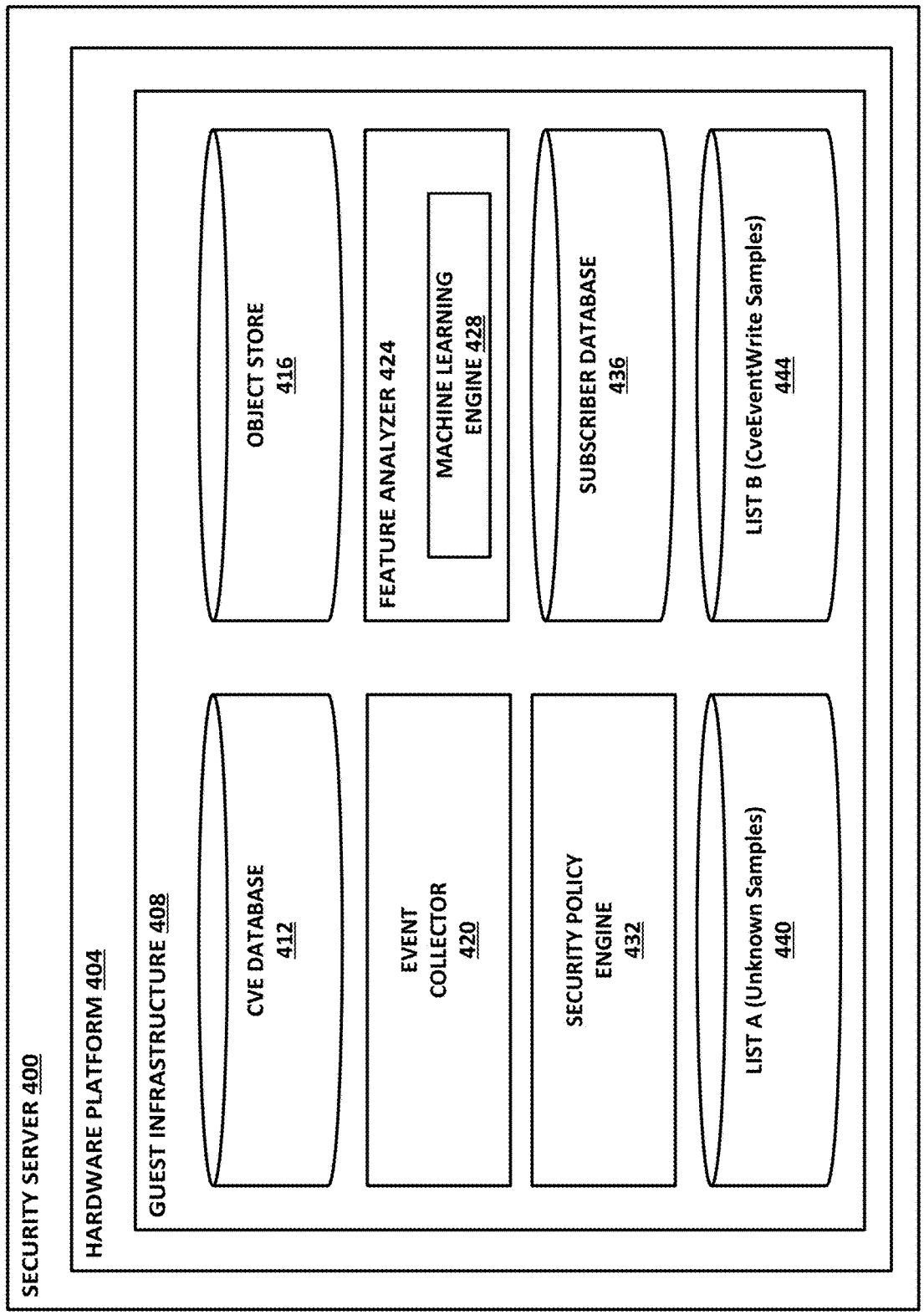
FIG. 4 is a block diagram of a security server.

FIG. 4 is a block diagram of a security server 400. Security server 400 includes a hardware platform 404, which provides the hardware to provide the services described. Hardware platform 404 could be a standalone server, a rack-mount or blade-mount server, or any other suitable hardware.

In this example, hardware platform 404 includes a guest infrastructure 408. Guest infrastructure 408 may provide a number of virtual machines or containers that operate on hardware platform 404, and which may be provided as discrete services or microservices, or as a monolithic server that provides several services.

In this example, security server 400 includes a CVE database 412. CVE database 412 includes identifications of patched vulnerabilities, and identifiers assigned to those patched vulnerabilities, which can be correlated to events such as, for example, when a new object attempts to exploit a known vulnerability.

Object store 416 may be a database of objects that have been previously encountered in the enterprise or throughout the industry, and which have been characterized and convicted as malicious. For example, object store 416 may include a number of objects that have been convicted as malicious based on their attempts to exploit a known vulnerability, or because they have been compared to such objects and convicted. In other examples, object store 416 could include objects that have been otherwise analyzed.

Event collector 420 may be a service that collects events from endpoint devices, such as when endpoint devices report a new object attempting to exploit a known vulnerability. In those cases, event collector 420 collects appropriate metadata about the event and stores, for example, metadata about the object making the attempt in object store 416. Event collector 420 may also store information about the vulnerability in CVE database 412.

Feature analyzer 424 may analyze features of objects, including metadata about the objects, as well as static features, dynamic features, binary images, full objects, hashes, or other information about the objects. Feature analyzer 424 may operate a machine learning engine 428. Machine learning engine 428 may provide appropriate machine learning or other algorithms that are used to analyze objects. In particular, machine learning engine 428 may provide an algorithm or a method that can compare an unknown object to a large number of previously encountered objects, such as those in object store 416. In one particular example, FIGS. 7-10 provide an illustrative method that may be used to compare a large number of previously encountered objects to a newly encountered object, and then to convict or pass the newly encountered object. The teachings of FIGS. 7-10 are provided as an illustrative and nonlimiting example, and other methods may be used. For example, an alternative method could include visual analysis by a machine learning system that has been trained to visually recognize malware objects and to classify them according to their visual characteristics.

A security policy engine 432 may include appropriate security policies for responding to classifications or reputations made by feature analyzer 424. For example, security policy engine 432 may push out to endpoints security responses for when an object is convicted, passed, or has an unknown reputation. If the object is convicted, for example, security policy engine 432 may instruct the endpoint to delete the object, quarantine the object, or provide the full object back to security server 400 for additional analysis. In cases where the object still has an unknown reputation, security server 400 may request the full object, or may request the endpoint to perform a more detailed static or dynamic analysis on the object to determine whether it is malicious or benign. If feature analyzer 424 determines that the object is benign, then security policy engine 432 may instruct the endpoint that it may pass the object, and that the object is safe to operate on the network.

A subscriber database 436 may include subscriber information about individuals or enterprises that subscribe to services provided by security server 400. For example, subscriber database 436 may include usernames, accounts, passwords, billing data, and other information to determine which users are entitled to receive the security services of security server 400.

Security server 400 may maintain lists of known and unknown objects. For example, list A may be a list of unknown samples 440, which need to be characterized. List B may be a list of CveEventWrite samples 444, which have been previously characterized, and which have known reputations. List A 440 and list B 444 may be used, for example, in a case where machine learning engine 428 carries out the method disclosed in FIGS. 7-10 of the present specification. In that case, list A 440 and list B 444 may form the two lists that are used for the comparison. These two lists can then be used to determine whether objects in list A 440 are malicious or benign, based on their similarity to objects in list B 444.

Figure 5:
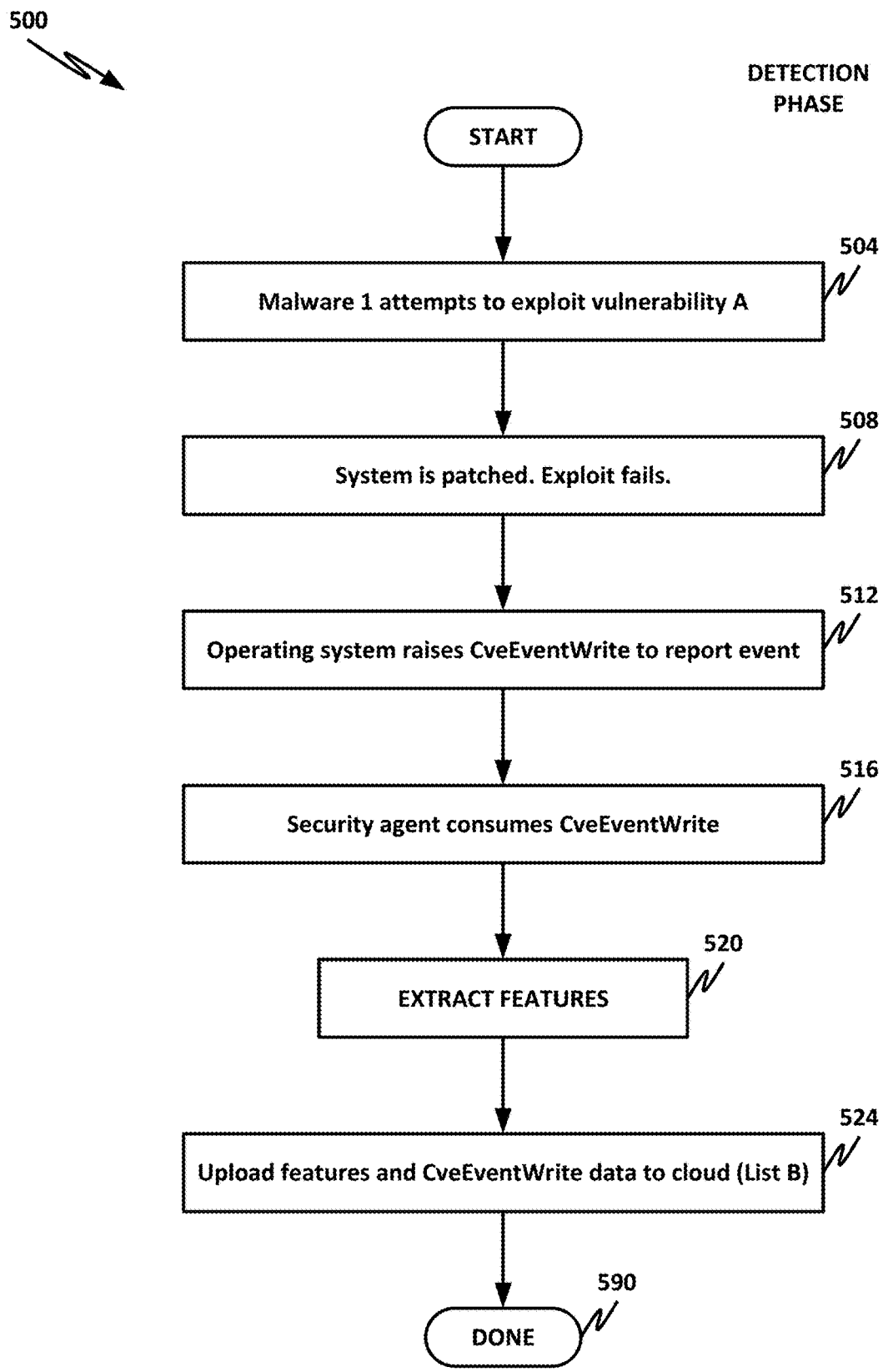
FIG. 5 is a flowchart of a method that provides an illustrative detection phase.
Figure 6:
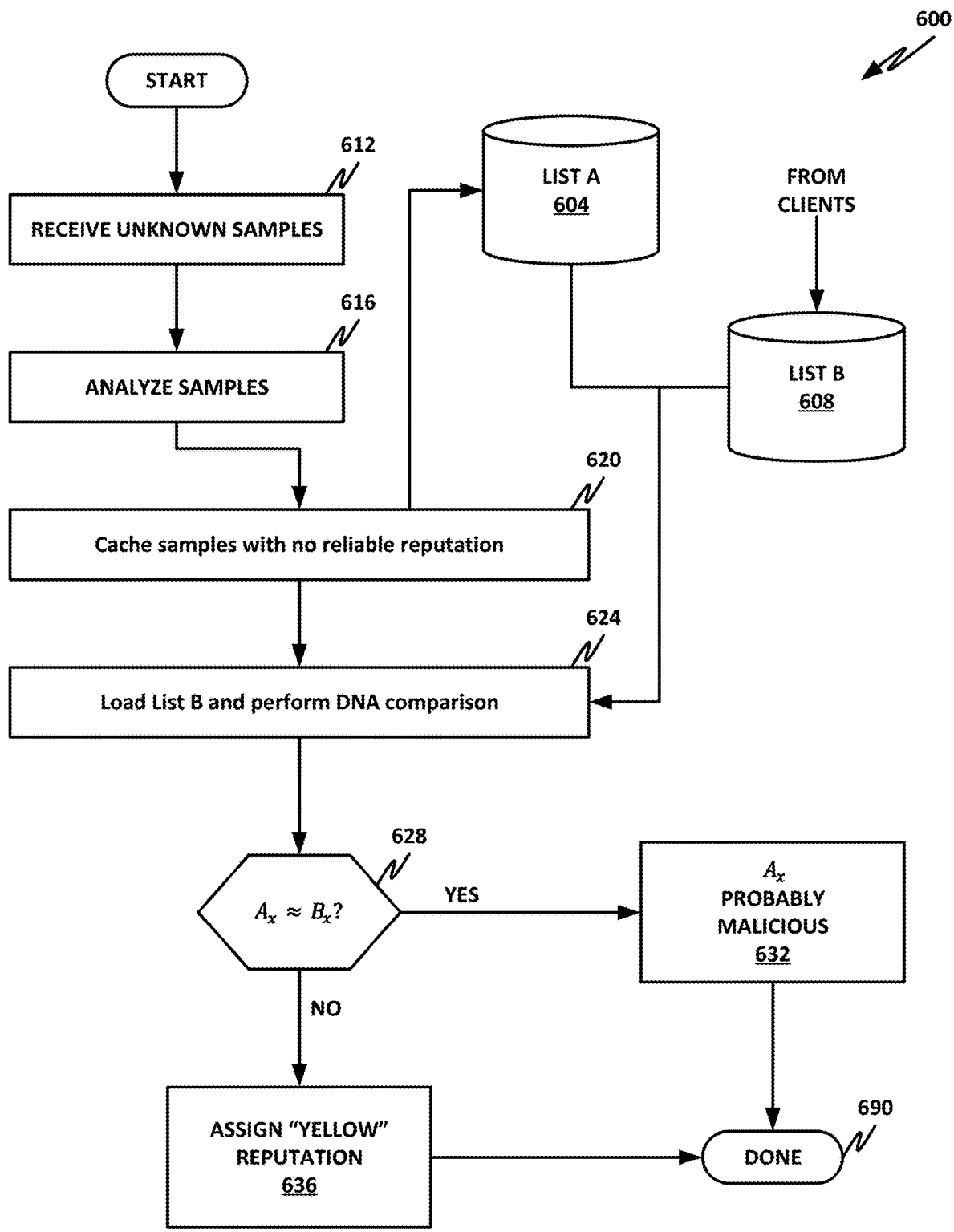
FIG. 6 is a flowchart of a method illustrating an example extrapolation phase.

FIG. 5 and FIG. 6 illustrate that the teachings of the present specification may, by way of illustration and example only, be divided into two operative phases. The first phase is deemed a recognition phase. This works by collecting samples that are observed to be attempting to exploit vulnerabilities, provided by the operating system events as described above. The second phase is an extrapolation phase. This phase works by comparing unknown samples with a list of previously observed samples. These include an attempted vulnerability exploitation event. The extrapolation phase leverages the sample similarity to determine whether an object in the unknown list is similar enough to one or more objects in the previously convicted list to convict the new unknown object. An example method of carrying this out is described in FIGS. 7-10, below. However, any other suitable method could also be used.

In this case, the feature vector may be divided into groups of features that are used to first narrow down a list of potential candidates, and then later to compute sub-distances that approximate the closest or most-similar samples. By using this "DNA similarity technology," the extrapolation phase uses all of the samples that include a CVE event as the reference group (e.g., list B 444 of FIG. 4). Unknown samples (e.g., list A 440 of FIG. 4) are samples that were collected from unpatched or any other type of system that can't be convicted with existing detection mechanisms. For these unknown samples, the system attempts to find the most-similar ones in the reference group. If any unknown sample is found to be highly similar to a malicious sample in the reference group, then this unknown sample can be reclassified as malicious or potentially malicious, based on its observed similarity to another sample. Because the other sample that it is comparable to exploits or attempts to exploit a known vulnerability, the new sample that is similar to it can also be classified as malicious. Note that the sample that attempted to exploit a vulnerability can be convicted regardless of whether it has a strong or weak feature-based correlation to other samples. In this case, the fact that it attempts to exploit a vulnerability is treated as evidence per se that the sample is malicious.

FIG. 5 is a flowchart of a method 500 that provides an illustrative detection phase that may be used in conjunction with the present specification.

Starting at block 504, a sample referred to as malware 1 attempts to exploit a vulnerability referred to as vulnerability A.

In block 508, because the system that is the target of the exploit is patched, the exploit fails. Thus, malware 1 is not able to perform any useful work on the system via vulnerability A.

In block 512, the operating system raises an event such as, for example, a CveEventWrite. This reports out that an attempt was made to exploit a known vulnerability.

In block 516, an appropriate process such as a security agent consumes the CveEventWrite notification. In this case, the security agent knows that the previously unknown object has attempted to exploit a known vulnerability. Based on this, malware 1 may be convicted as malware based on the attempt.

In block 520, the security agent may extract features from malware 1, so that it can be characterized.

In block 524, these features may be uploaded along with CveEventWrite data to a cloud service. The cloud service treats these as list B (e.g., list B 444 of FIG. 4). This provides the malware server with a list of known malicious objects that can be compared to new unknown objects.

In block 590, the method is done.

FIG. 6 is a flowchart of a method 600 illustrating an example extrapolation phase. Method 600 illustrates an example extrapolation phase, as discussed above.

The extrapolation phase may be carried out by, for example, security server 400 of FIG. 4, or by any other appropriate system.

Starting in block 612, the system receives one or more unknown samples from client or endpoint devices. These unknown samples are loaded into list B 608. Note that in response to method 500 of FIG. 5, the system may have already populated list A 604 with samples taken from CveEventWrites.

In block 616, the system analyzes the samples to determine if they have a known reliable reputation.

In block 620, any objects without a known reliable reputation are to be cached in list B 608.

In block 624, the system loads list B and performs a DNA comparison against list A 604. This DNA comparison may follow, for example, the method illustrated in FIGS. 7-10, below.

In block 628, the system determines for each object in list A ($A_X$) whether there is an object in list B ($B_X$) that is sufficiently similar to $A_X$.

In block 632, if there is found a $B_X$ that is sufficiently similar, then the system may determine that $A_X$ is probably malicious. Thus, based on this similarity, the object may be convicted and appropriate action may be taken. In some cases, this could also include adding object $A_X$ to list B, so that it can be used for comparison to future objects.

Returning to block 628, if there is not found any $B_X$ that is sufficiently similar to $A_X$, then in block 636, the object may be assigned a "yellow" or "caution" reputation, which indicates that the object has not been convicted, but that it may require further analysis to determine whether it is malicious or benign. Based on enterprise or user policies, the object may then be subjected to additional analysis, as appropriate.

In block 690, the method is done.

Figure 7:
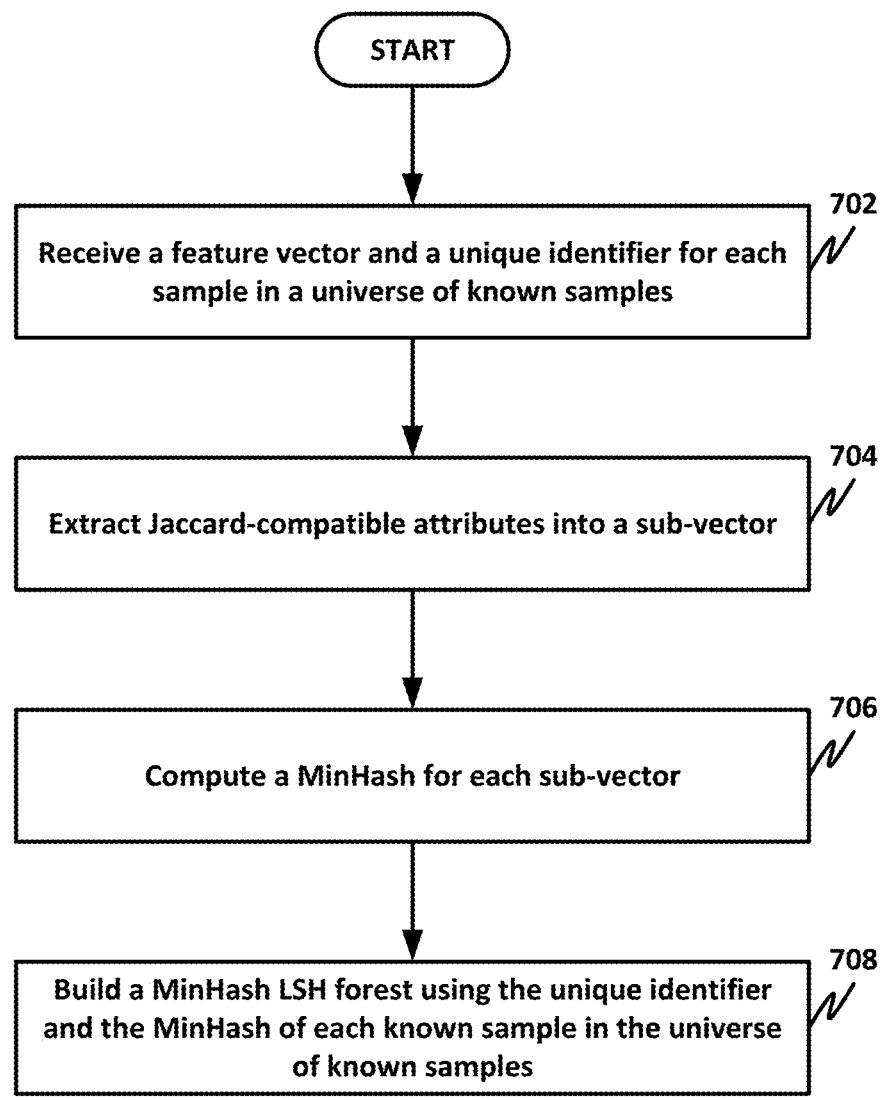
FIG. 7 is a simplified flowchart illustrating potential operations that may be associated with building a MinHash locality sensitive hashing (LSH) forest of a universe of known samples.

FIG. 7 is a simplified flowchart illustrating potential operations that may be associated with building a MinHash locality sensitive hashing (LSH) forest of a universe of known samples.

At 702, a feature vector and a unique identifier is received for each sample in a universe of known samples. The unique identifier may be calculated using a hash function, such as a message-digest algorithm 5 (MD5) hash algorithm which produces a 128-bit hash value.

At 704, Jaccard-compatible attributes of the feature vector are extracted into a sub-vector for each sample in the universe of known samples.

At 706, a MinHash is computed for each sub-vector.

At 708, a MinHash LSH forest is built using the unique identifier and the computed MinHash of each sample in the universe of known samples.

Figure 8:
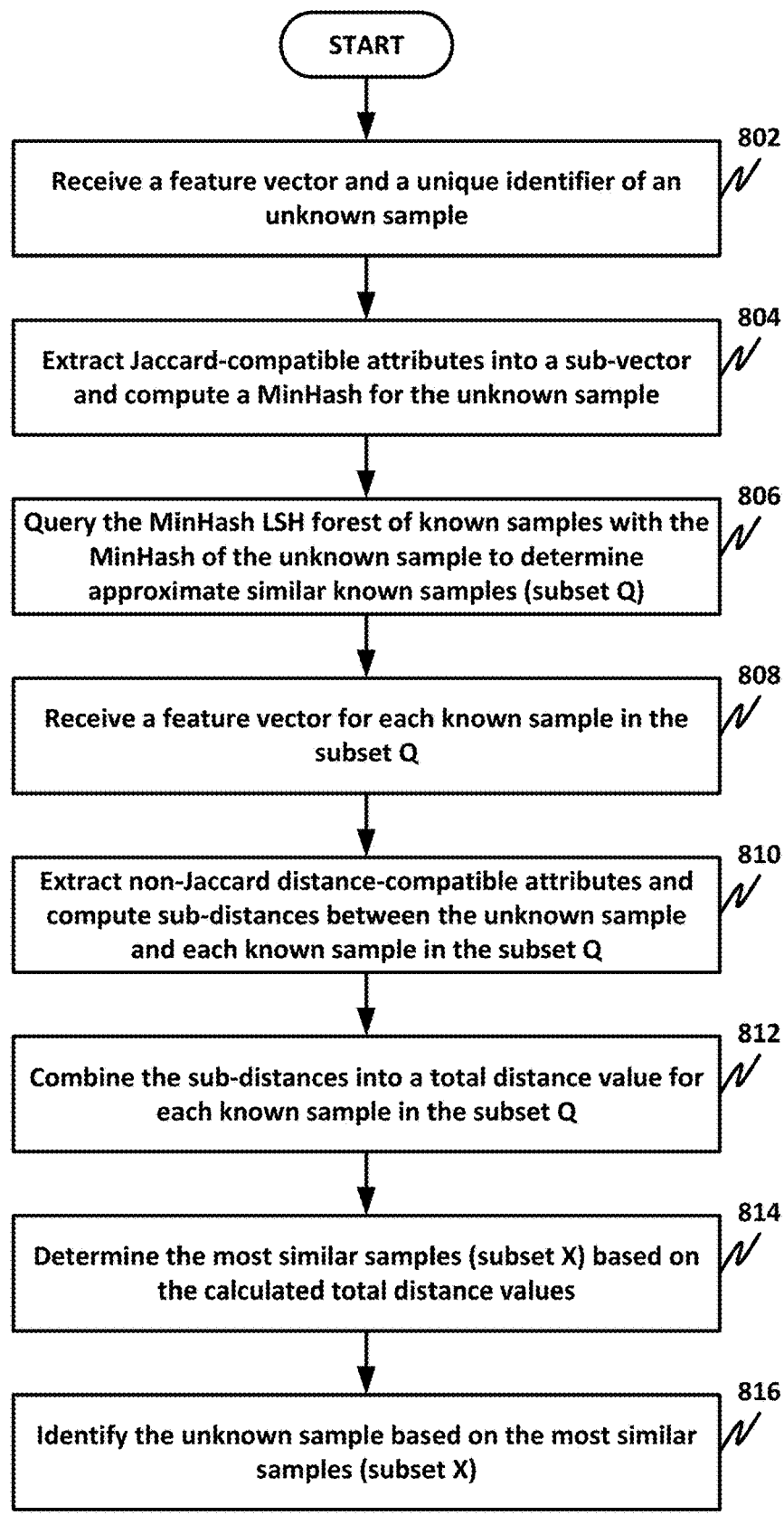
FIG. 8 is a simplified flowchart illustrating potential operations that may be associated with identifying an unknown sample from a universe of samples.

FIG. 8 is a simplified flowchart illustrating potential operations that may be associated with identifying an unknown sample from a universe of samples.

At 802, a feature vector of an unknown sample is received.

At 804, the Jaccard-compatible attributes are extracted from the feature vector and a MinHash is computed for the unknown sample.

At 806, the MinHash LSH forest of known samples is queried using the MinHash of the unknown sample to identify a set of approximate similar known samples (i.e., subset Q).

At 808, a feature vector is received for each known sample in the subset Q.

At 810, the non-Jaccard distance-compatible attributes are extracted from each feature vector and sub-distances are calculated between the unknown sample and each known sample in the subset Q.

At 812, the calculated sub-distances are combined into a final distance (e.g., a custom distance metric) for each known sample in the subset Q.

At 814, a set of most-similar known samples (subset X) is identified based on the calculated total distances, where a lower total distance value indicates a more similar known sample. Subset X may be determined using any suitable technique. For example, subset X may be determined based on a target number of most-similar known samples, or may be determined based on a total distance being equal to or below a threshold value.

At 816, the unknown sample is identified based on the most-similar known samples in subset X.

Figure 9:
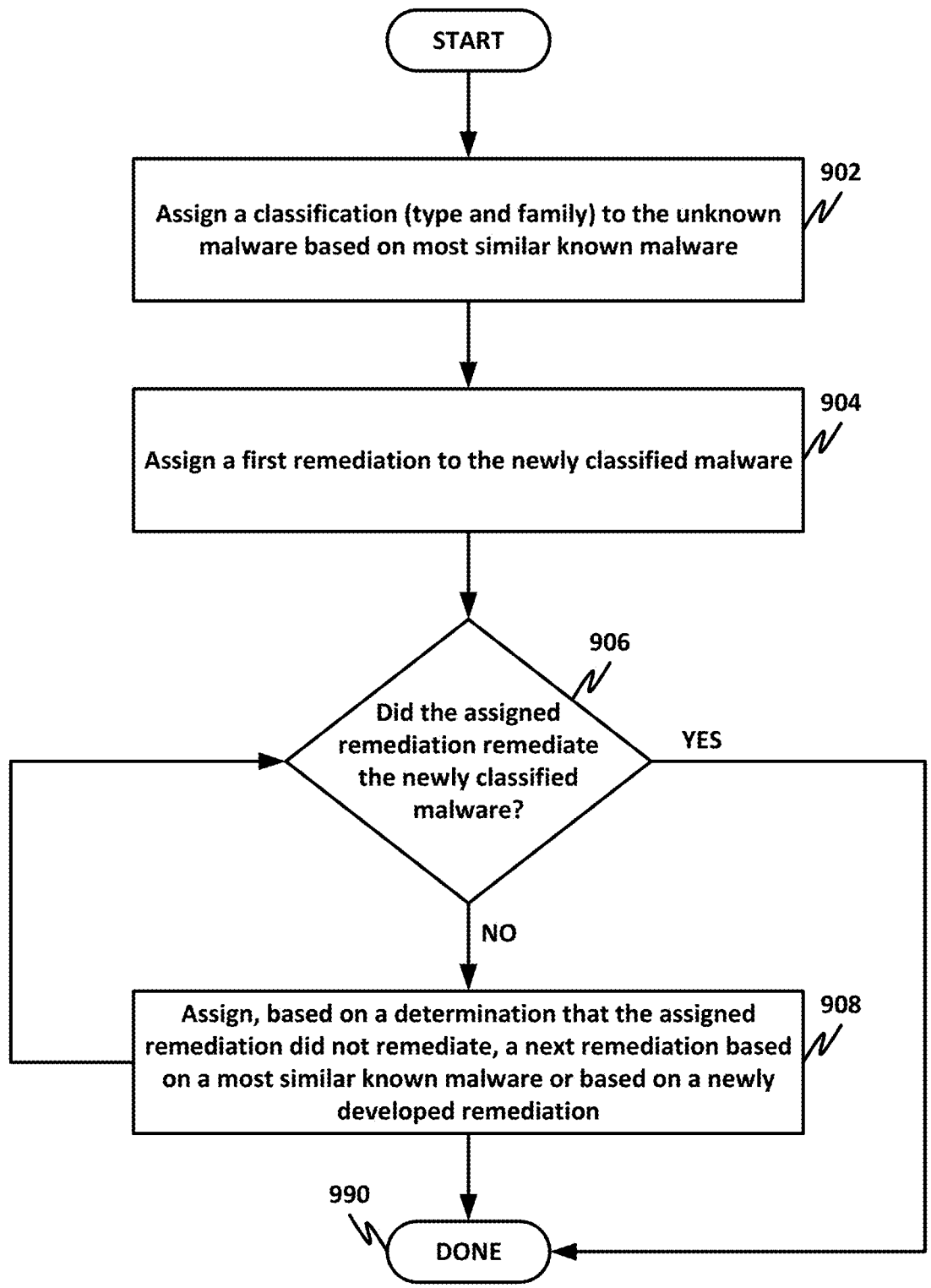
FIG. 9 is a simplified flowchart illustrating potential operations that may be associated with assigning a corrective action to a newly identified malware sample.

FIG. 9 is a simplified flowchart illustrating potential operations that may be associated with assigning a corrective action to a newly identified malware sample.

At 902, the unknown sample may be assigned a classification based on the most-similar known samples of subset X. Example classifications may include a type, a family, an author, and a source location (e.g., country or organization), among other classifications. The classifications may be used to identify whether the malware is part of a campaign, such as a nation state campaign or a crime organization campaign.

At 904, a remediation or other corrective action may be assigned to remediate the newly classified malware and may be based on a remediation that worked for a most-similar known malware in the subset X.

At 906, a determination is made as to whether the assigned remediation remediated the newly classified malware. If the remediation remediated the newly classified malware, the process ends. If the remediation did not remediate the newly classified malware, then the process continues to 908.

At 908, based on a determination that the newly classified malware was not remediated, a next remediation may be assigned. For example, the next remediation may be assigned based on another most-similar known malware remediation or based on a remediation that was developed for the newly classified malware. The operations at 906 and 908 continue until the newly classified malware is remediated. In some embodiments, the remediation that worked to remediate the newly classified malware may be stored in memory and may be associated with newly classified malware.

At terminal 990, the operations are concluded.

Figure 10:
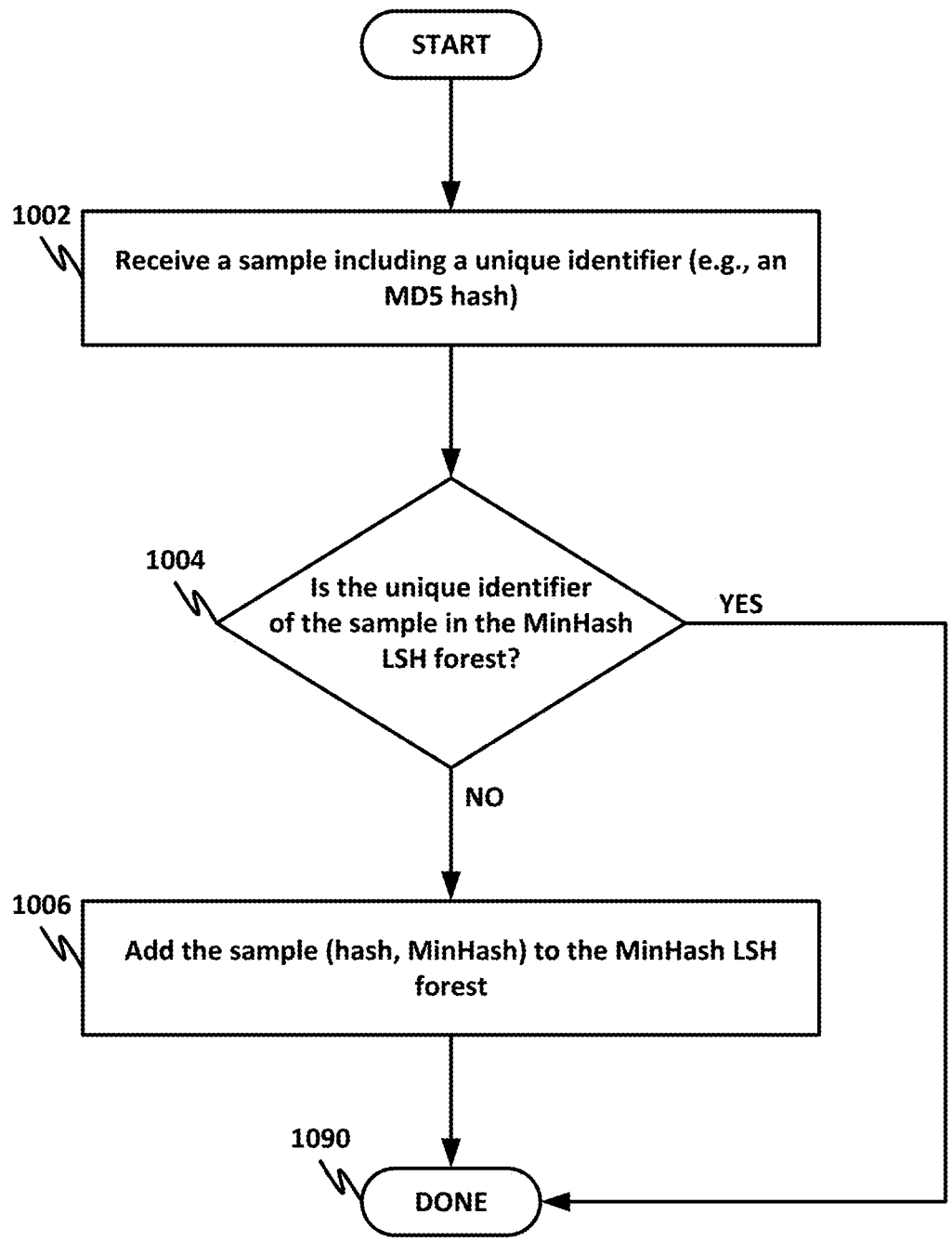
FIG. 10 is a simplified flowchart illustrating potential operations that may be associated with adding a sample to a universe of samples.

FIG. 10 is a simplified flowchart illustrating potential operations that may be associated with adding a sample to a universe of samples.

At 1002, a sample is received, including a unique identifier (e.g., an MD5 hash). The feature vector of the sample also may be received. In some embodiments, the sample may be an unknown sample, where the unique identifier is used to query the MinHash LSH forest to determine whether the sample is known (e.g., included in the MinHash LSH forest). If the sample is unknown (e.g., not included in the MinHash LSH forest), the sample may be classified as described above. In some embodiments, the sample may be a newly classified sample (e.g., not included in the MinHash LSH forest).

At 1004, a determination is made as to whether the unique identifier of the sample is included in the MinHash LSH forest that was built based on the universe of known samples by querying the forest index. If the unique identifier is included in the forest, the process ends. If the unique identifier is not included, then the process proceeds to 1006.

At 1006, the sample is added to the MinHash LSH forest using its unique identifier and the Jaccard attributes of its feature vector.

At terminal 1090, the operations are concluded.

Figure 11:
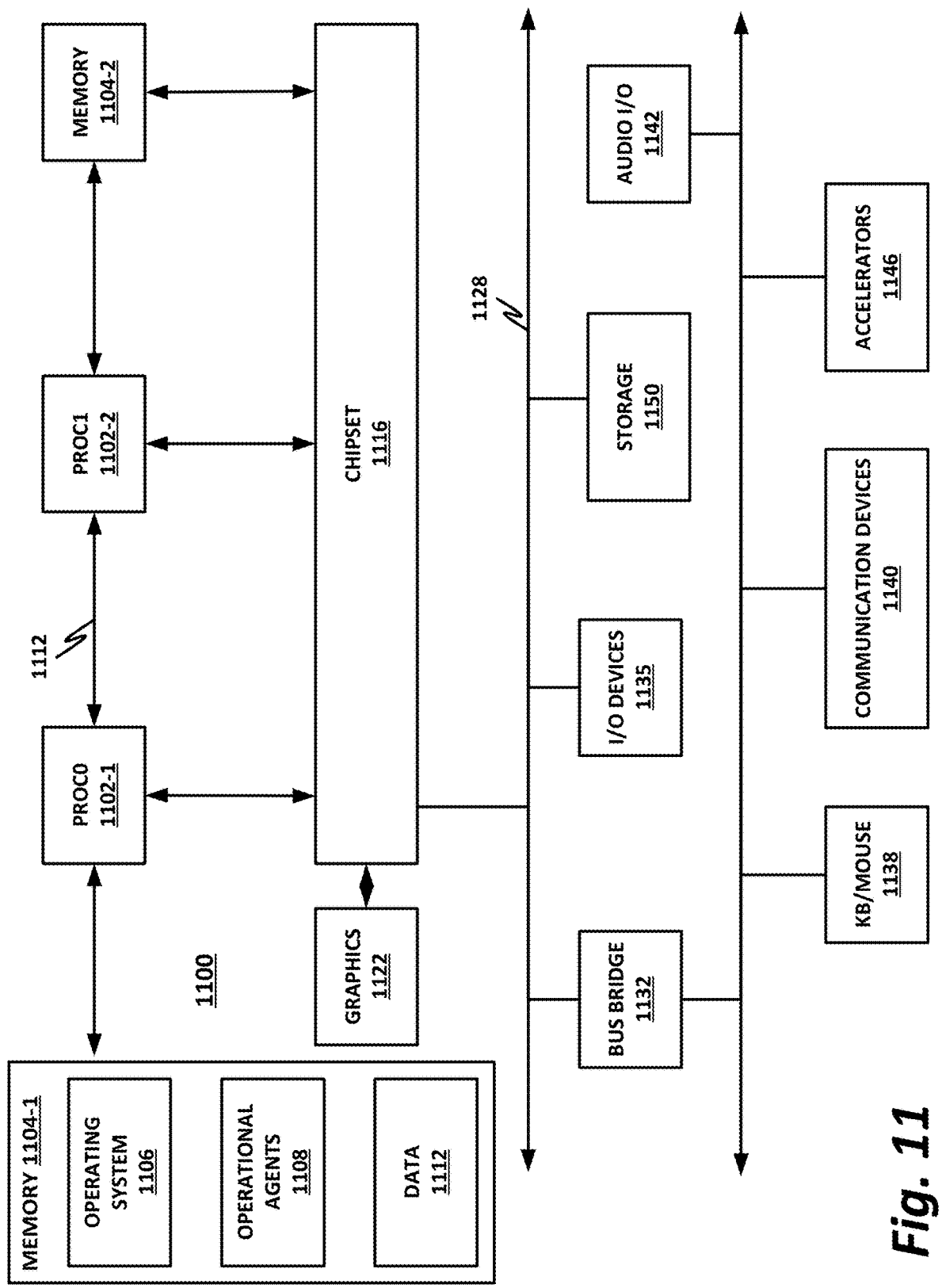
FIG. 11 is a block diagram of selected elements of a hardware platform.

FIG. 11 is a block diagram of a hardware platform 1100. In at least some embodiments, hardware platform 1100 may be programmed, configured, or otherwise adapted to provide malware detection from operating system event tracing, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 1100, even though they may be scattered across a data center, or even located in different data centers.

Hardware platform 1100 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1100 is arranged in a point-to-point (PtP) configuration. This PtP configuration is popular for personal computer (PC) and server-type devices, although it is not so limited, and any other bus type may be used.

Hardware platform 1100 is an example of a platform that may be used to implement embodiments of the teachings of this specification. For example, instructions could be stored in storage 1150. Instructions could also be transmitted to the hardware platform in an ethereal form, such as via a network interface, or retrieved from another source via any suitable interconnect. Once received (from any source), the instructions may be loaded into memory 1104, and may then be executed by one or more processor 1102 to provide elements such as an operating system 1106, operational agents 1108, or data 1112.

Hardware platform 1100 may include several processors 1102. For simplicity and clarity, only processors PROC0 1102-1 and PROC1 1102-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 1102 may be any type of processor and may communicatively couple to chipset 1116 via, for example, PtP interfaces. Chipset 1116 may also exchange data with other elements, such as a high performance graphics adapter 1122. In alternative embodiments, any or all of the PtP links illustrated in FIG. 11 could be implemented as any type of bus, or other configuration rather than a PtP link. In various embodiments, chipset 1116 may reside on the same die or package as a processor 1102 or on one or more different dies or packages. Each chipset may support any suitable number of processors 1102. A chipset 1116 (which may be a chipset, uncore, Northbridge, Southbridge, or other suitable logic and circuitry) may also include one or more controllers to couple other components to one or more central processor units (CPUs).

Two memories, 1104-1 and 1104-2 are shown, connected to PROC0 1102-1 and PROC1 1102-2, respectively. As an example, each processor is shown connected to its memory in a direct memory access (DMA) configuration, though other memory architectures are possible, including ones in which memory 1104 communicates with a processor 1102 via a bus. For example, some memories may be connected via a system bus, or in a data center, memory may be accessible in a remote DMA (RDMA) configuration.

Memory 1104 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1104 may be used for short, medium, and/or long-term storage. Memory 1104 may store any suitable data or information utilized by platform logic. In some embodiments, memory 1104 may also comprise storage for instructions that may be executed by the cores of processors 1102 or other processing elements (e.g., logic resident on chipsets 1116) to provide functionality.

In certain embodiments, memory 1104 may comprise a relatively low-latency volatile main memory, while storage 1150 may comprise a relatively higher-latency non-volatile memory. However, memory 1104 and storage 1150 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1104 and storage 1150, for example, in a single physical memory device, and in other cases, memory 1104 and/or storage 1150 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 1122 may be configured to provide a human-readable visual output, such as a command-line interface (CLI) or graphical desktop such as Microsoft Windows, Apple OSX desktop, or a Unix/Linux X Window System-based desktop. Graphics adapter 1122 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 1122 may include a hardware graphics card, which may have its own memory and its own graphics processing unit (GPU).

Chipset 1116 may be in communication with a bus 1128 via an interface circuit. Bus 1128 may have one or more devices that communicate over it, such as a bus bridge 1132, I/O devices 1135, accelerators 1146, communication devices 1140, and a keyboard and/or mouse 1138, by way of nonlimiting example. In general terms, the elements of hardware platform 1100 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1140 can broadly include any communication not covered by a network interface and the various I/O devices described herein. This may include, for example, various universal serial bus (USB), FireWire, Lightning, or other serial or parallel devices that provide communications.

I/O Devices 1135 may be configured to interface with any auxiliary device that connects to hardware platform 1100 but that is not necessarily a part of the core architecture of hardware platform 1100. A peripheral may be operable to provide extended functionality to hardware platform 1100, and may or may not be wholly dependent on hardware platform 1100. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 1142 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 1132 may be in communication with other devices such as a keyboard/mouse 1138 (or other input devices such as a touch screen, trackball, etc.), communication devices 1140 (such as modems, network interface devices, peripheral interfaces such as PCI or PCIe, or other types of communication devices that may communicate through a network), audio I/O 1142, and/or accelerators 1146. In alternative embodiments, any portions of the bus architectures could be implemented with one or more PtP links.

Operating system 1106 may be, for example, Microsoft Windows, Linux, UNIX, Mac OS X, iOS, MS-DOS, or an embedded or real-time operating system (including embedded or real-time flavors of the foregoing). In some embodiments, a hardware platform 1100 may function as a host platform for one or more guest systems that invoke application (e.g., operational agents 1108).

Operational agents 1108 may include one or more computing engines that may include one or more non-transitory computer-readable mediums having stored thereon executable instructions operable to instruct a processor to provide operational functions. At an appropriate time, such as upon booting hardware platform 1100 or upon a command from operating system 1106 or a user or security administrator, a processor 1102 may retrieve a copy of the operational agent (or software portions thereof) from storage 1150 and load it into memory 1104. Processor 1102 may then iteratively execute the instructions of operational agents 1108 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 1100 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 1100 may be virtualized, in particular the processor(s) and memory. For example, a virtualized environment may run on OS 1106, or OS 1106 could be replaced with a hypervisor or virtual machine manager. In this configuration, a virtual machine running on hardware platform 1100 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 11 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 12. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 12:
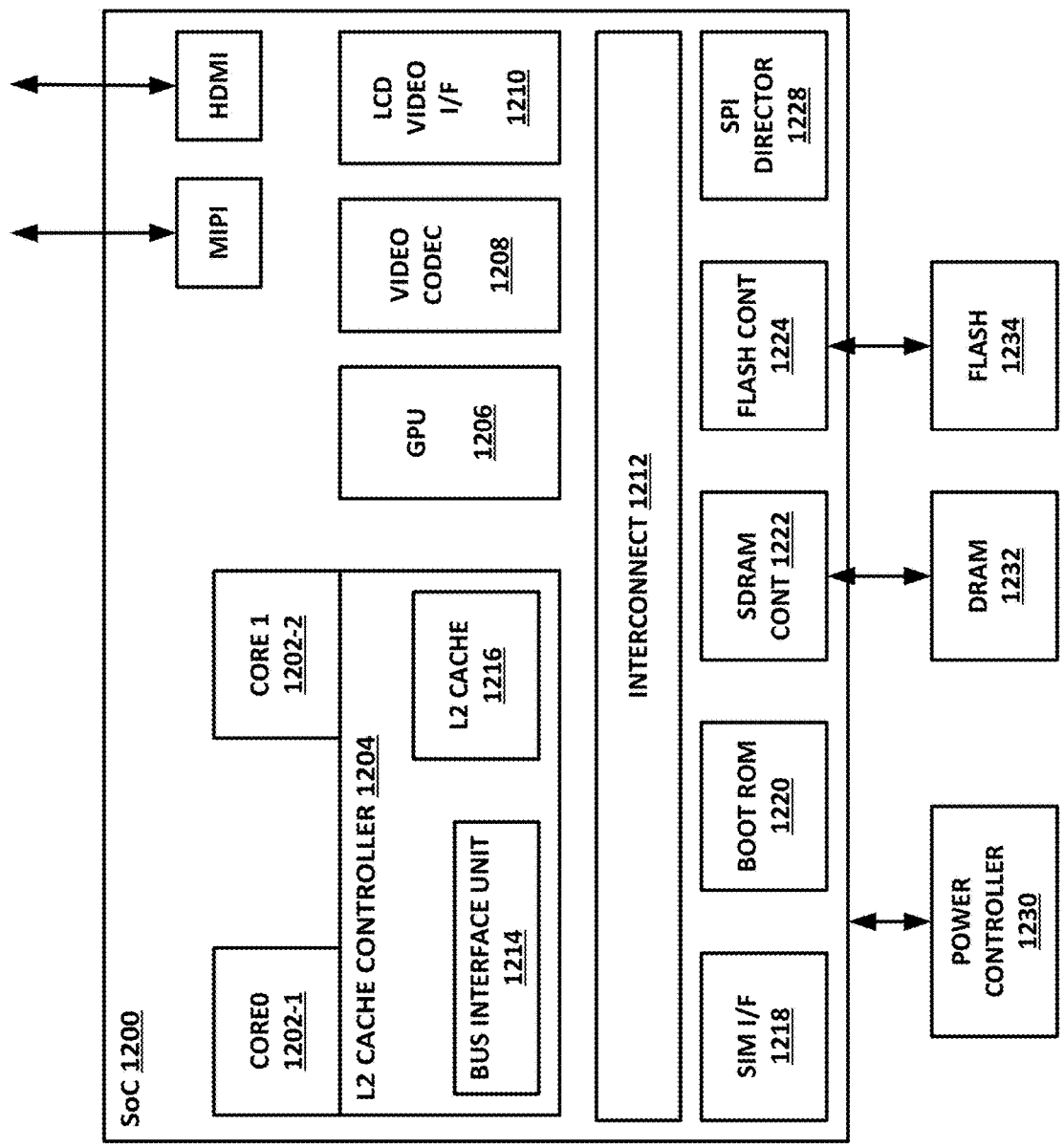
FIG. 12 is a block diagram of selected elements of a system-on-a-chip (SoC).

FIG. 12 is a block illustrating selected elements of an example SoC 1200. In at least some embodiments, hardware platform 1200 may be programmed, configured, or otherwise adapted to provide malware detection from operating system event tracing, according to the teachings of the present specification.

At least some of the teachings of the present specification may be embodied on an SoC 1200, or may be paired with an SoC 1200. SoC 1200 may include, or may be paired with, an advanced reduced instruction set computer machine (ARM) component. For example, SoC 1200 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1200 could also be integrated into, for example, a PC, server, video processing components, laptop computer, notebook computer, netbook, or touch-enabled device.

As with hardware platform 1100 above, SoC 1200 may include multiple cores 1202-1 and 1202-2. In this illustrative example, SoC 1200 also includes an L2 cache control 1204, a GPU 1206, a video codec 1208, a liquid crystal display (LCD) I/F 1210 and an interconnect 1212. L2 cache control 1204 can include a bus interface unit 1214, a L2 cache 1216. Liquid crystal display (LCD) I/F 1210 may be associated with mobile industry processor interface (MIPI)/HDMI links that couple to an LCD.

SoC 1200 may also include a subscriber identity module (SIM) I/F 1218, a boot ROM 1220, a synchronous dynamic random access memory (SDRAM) controller 1222, a flash controller 1224, a serial peripheral interface (SPI) director 1228, a suitable power control 1230, a dynamic RAM (DRAM) 1232, and flash 1234. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 1200 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

Figure 13:
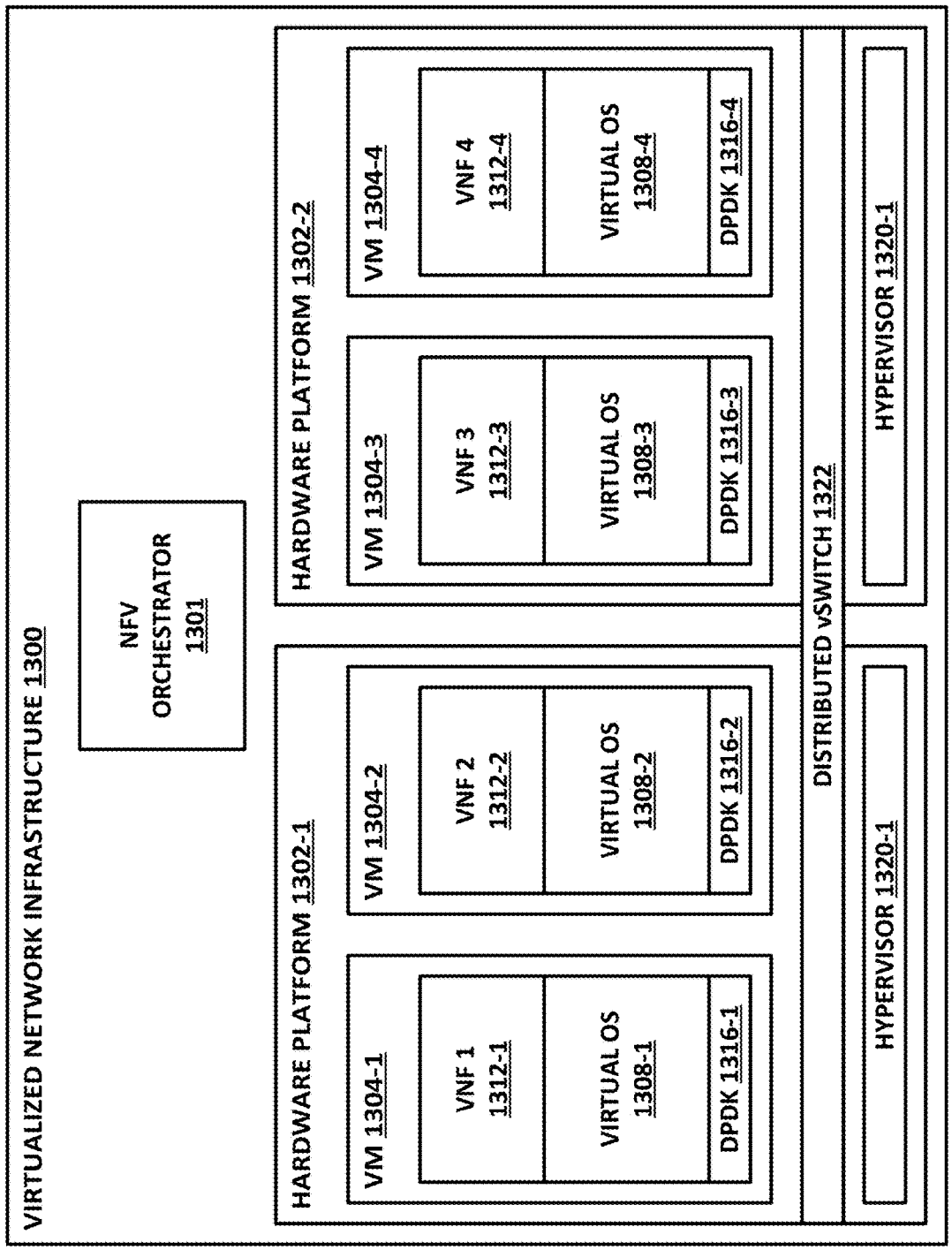
FIG. 13 is a block diagram of selected elements of a network function virtualization (NFV) infrastructure.

FIG. 13 is a block diagram of a network function virtualization (NFV) infrastructure 1300. FIG. 13 illustrates a platform for providing virtualization services. Virtualization may be used in some embodiments to provide one or more features of the present disclosure.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1300. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 13, an NFV orchestrator 1301 manages a number of the VNFs 1312 running on an NFVI 1300. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1301 a valuable system resource. Note that NFV orchestrator 1301 may provide a browser-based or graphical configuration interface, and in some embodiments may be integrated with SDN orchestration functions.

Note that NFV orchestrator 1301 itself may be virtualized (rather than a special-purpose hardware appliance). NFV orchestrator 1301 may be integrated within an existing SDN system, wherein an operations support system (OSS) manages the SDN. This may interact with cloud resource management systems (e.g., OpenStack) to provide NFV orchestration. An NFVI 1300 may include the hardware, software, and other infrastructure to enable VNFs to run. This may include a hardware platform 1302 on which one or more VMs 1304 may run. For example, hardware platform 1302-1 in this example runs VMs 1304-1 and 1304-2. Hardware platform 1302-2 runs VMs 1304-3 and 1304-4. Each hardware platform may include a hypervisor 1320, virtual machine manager (VMM), or similar function, which may include and run on a native (bare metal) operating system, which may be minimal so as to consume very few resources.

Hardware platforms 1302 may be or comprise a rack or several racks of blade or slot servers (including, e.g., processors, memory, and storage), one or more data centers, other hardware resources distributed across one or more geographic locations, hardware switches, or network interfaces. An NFVI 1300 may also include the software architecture that enables hypervisors to run and be managed by NFV orchestrator 1301.

Running on NFVI 1300 are a number of VMs 1304, each of which in this example is a VNF providing a virtual service appliance. Each VM 1304 in this example includes an instance of the Data Plane Development Kit (DPDK), a virtual operating system 1308, and an application providing the VNF 1312.

Virtualized network functions could include, as nonlimiting and illustrative examples, firewalls, intrusion detection systems, load balancers, routers, session border controllers, DPI services, network address translation (NAT) modules, or call security association.

The illustration of FIG. 13 shows that a number of VNFs 1304 have been provisioned and exist within NFVI 1300. This FIGURE does not necessarily illustrate any relationship between the VNFs and the larger network, or the packet flows that NFVI 1300 may employ.

The illustrated DPDK instances 1316 provide a set of highly-optimized libraries for communicating across a virtual switch (vSwitch) 1322. Like VMs 1304, vSwitch 1322 is provisioned and allocated by a hypervisor 1320. The hypervisor uses a network interface to connect the hardware platform to the data center fabric. This fabric may be shared by all VMs 1304 running on a hardware platform 1302. Thus, a vSwitch may be allocated to switch traffic between VMs 1304. The vSwitch may be a pure software vSwitch (e.g., a shared memory vSwitch), which may be optimized so that data are not moved between memory locations, but rather, the data may stay in one place, and pointers may be passed between VMs 1304 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1322 is illustrated, wherein vSwitch 1322 is shared between two or more physical hardware platforms 1302.

Figure 14:
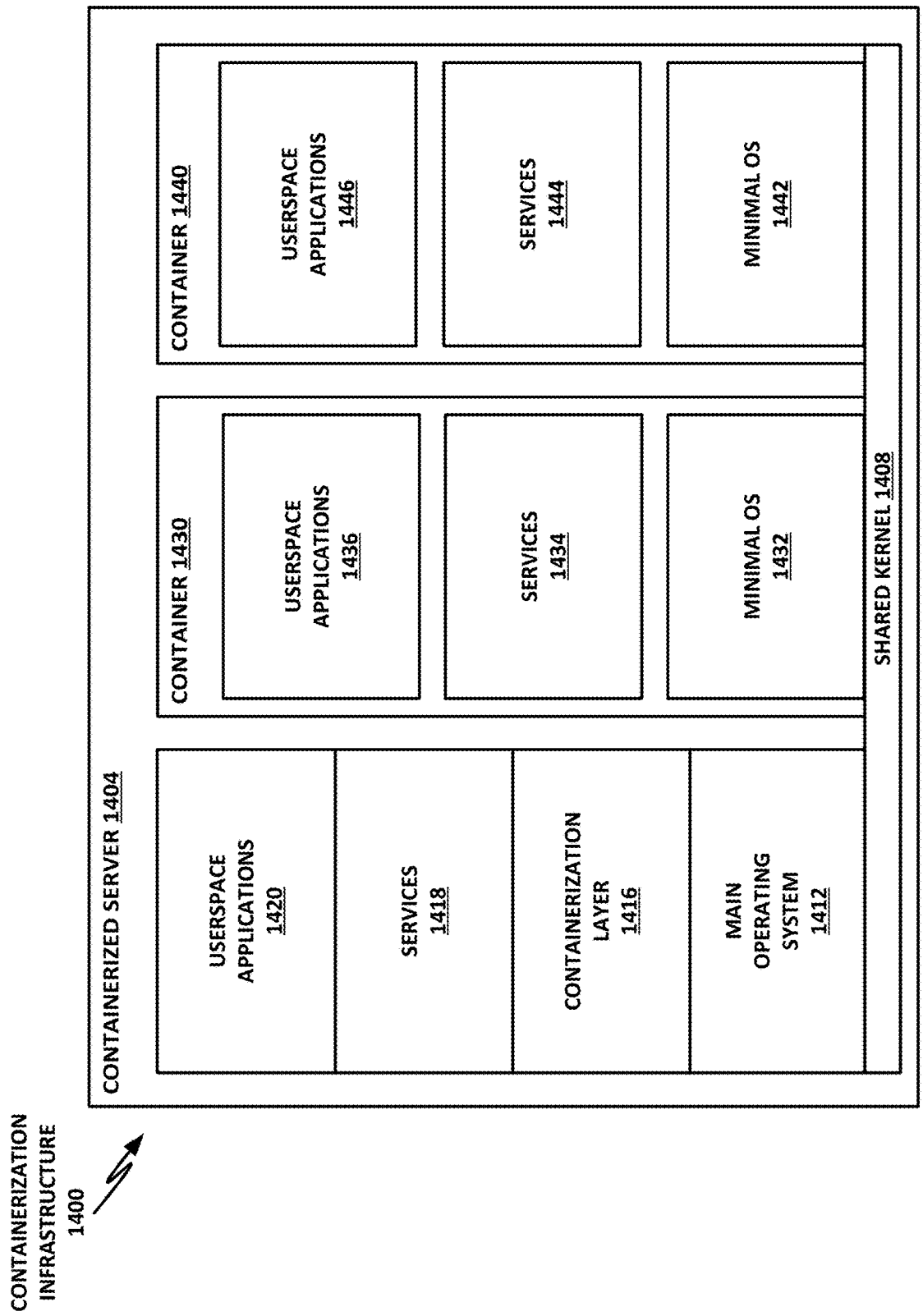
FIG. 14 is a block diagram of selected elements of a containerization infrastructure.

FIG. 14 is a block diagram of selected elements of a containerization infrastructure 1400. FIG. 14 illustrates a platform for providing containerization services. Containerization may be used in some embodiments to provide one or more features of the present disclosure. Like virtualization, containerization is a popular form of providing a guest infrastructure. Like virtualization, containerization is a popular form of providing a guest infrastructure.

Containerization infrastructure 1400 runs on a hardware platform such as containerized server 1404. Containerized server 1404 may provide a number of processors, memory, one or more network interfaces, accelerators, and/or other hardware resources.

Running on containerized server 1404 is a shared kernel 1408. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1408 is main operating system 1412. Commonly, main operating system 1412 is a Unix or Linux-based operating system, although containerization infrastructure is also available for other types of systems, including Microsoft Windows systems and Macintosh systems. Running on top of main operating system 1412 is a containerization layer 1416. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon.

Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1412 may also include a number of services 1418, which provide services and interprocess communication to userspace applications 1420.

Services 1418 and userspace applications 1420 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1412, they inherit the same file and resource access permissions as those provided by shared kernel 1408. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1404, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1404).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1404 hosts two containers, namely container 1430 and container 1440.

Container 1430 may include a minimal operating system 1432 that runs on top of shared kernel 1408. Note that a minimal operating system is provided as an illustrative example, and is not mandatory. In fact, container 1430 may perform as full an operating system as is necessary or desirable. Minimal operating system 1432 is used here as an example simply to illustrate that in common practice, the minimal operating system necessary to support the function of the container (which in common practice, is a single or monolithic function) is provided.

On top of minimal operating system 1432, container 1430 may provide one or more services 1434. Finally, on top of services 1434, container 1430 may also provide a number of userspace applications 1436, as necessary.

Container 1440 may include a minimal operating system 1442 that runs on top of shared kernel 1408. Note that a minimal operating system is provided as an illustrative example, and is not mandatory. In fact, container 1440 may perform as full an operating system as is necessary or desirable. Minimal operating system 1442 is used here as an example simply to illustrate that in common practice, the minimal operating system necessary to support the function of the container (which in common practice, is a single or monolithic function) is provided.

On top of minimal operating system 1442, container 1440 may provide one or more services 1444. Finally, on top of services 1444, container 1440 may also provide a number of userspace applications 1446, as necessary.

Using containerization layer 1416, containerized server 1404 may run a number of discrete containers, each one providing the minimal operating system and/or services necessary to provide a particular function. For example, containerized server 1404 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

Figure 15:
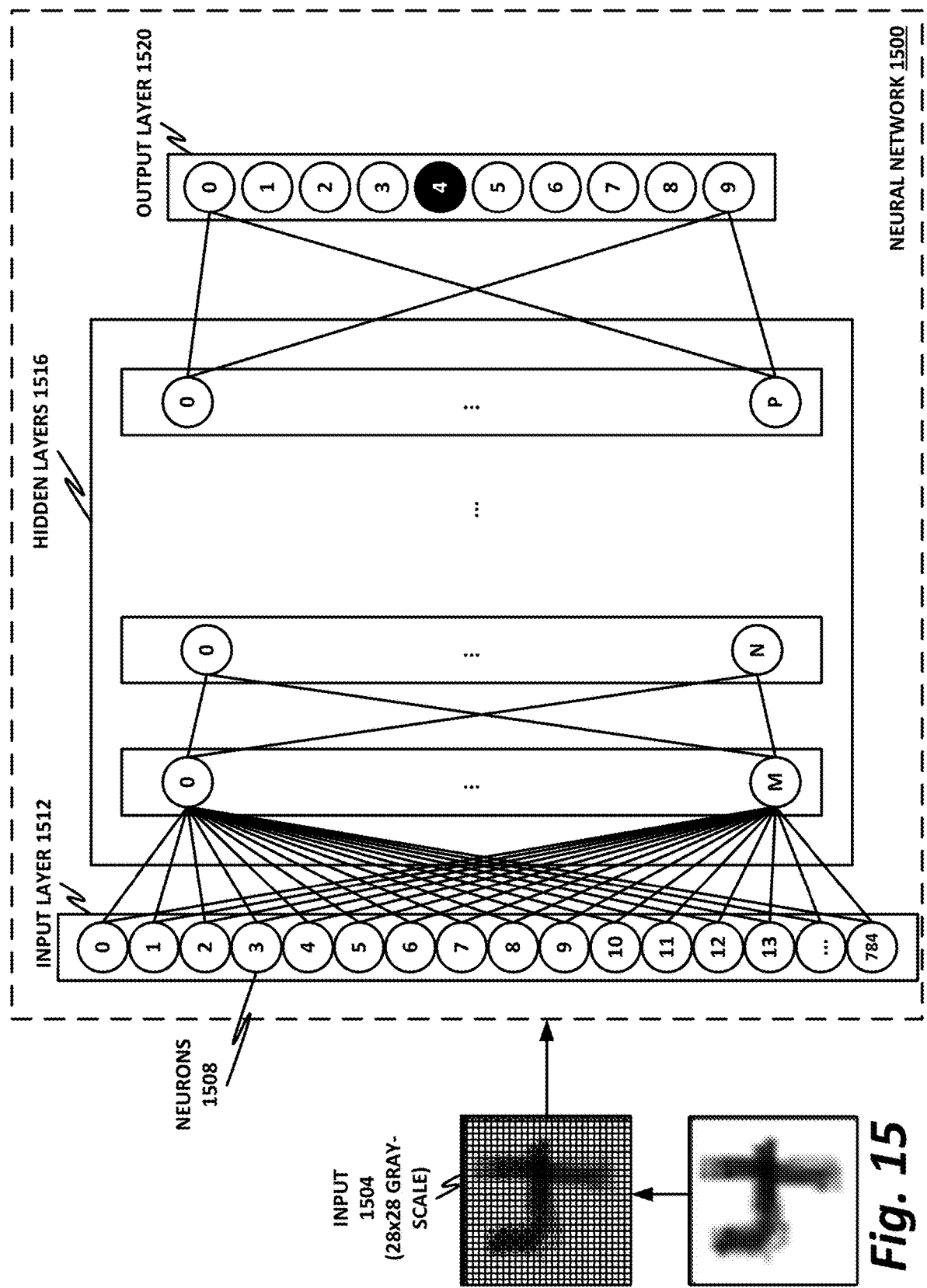
FIG. 15 illustrates machine learning according to a "textbook" problem with real-world applications.
Figure 16:
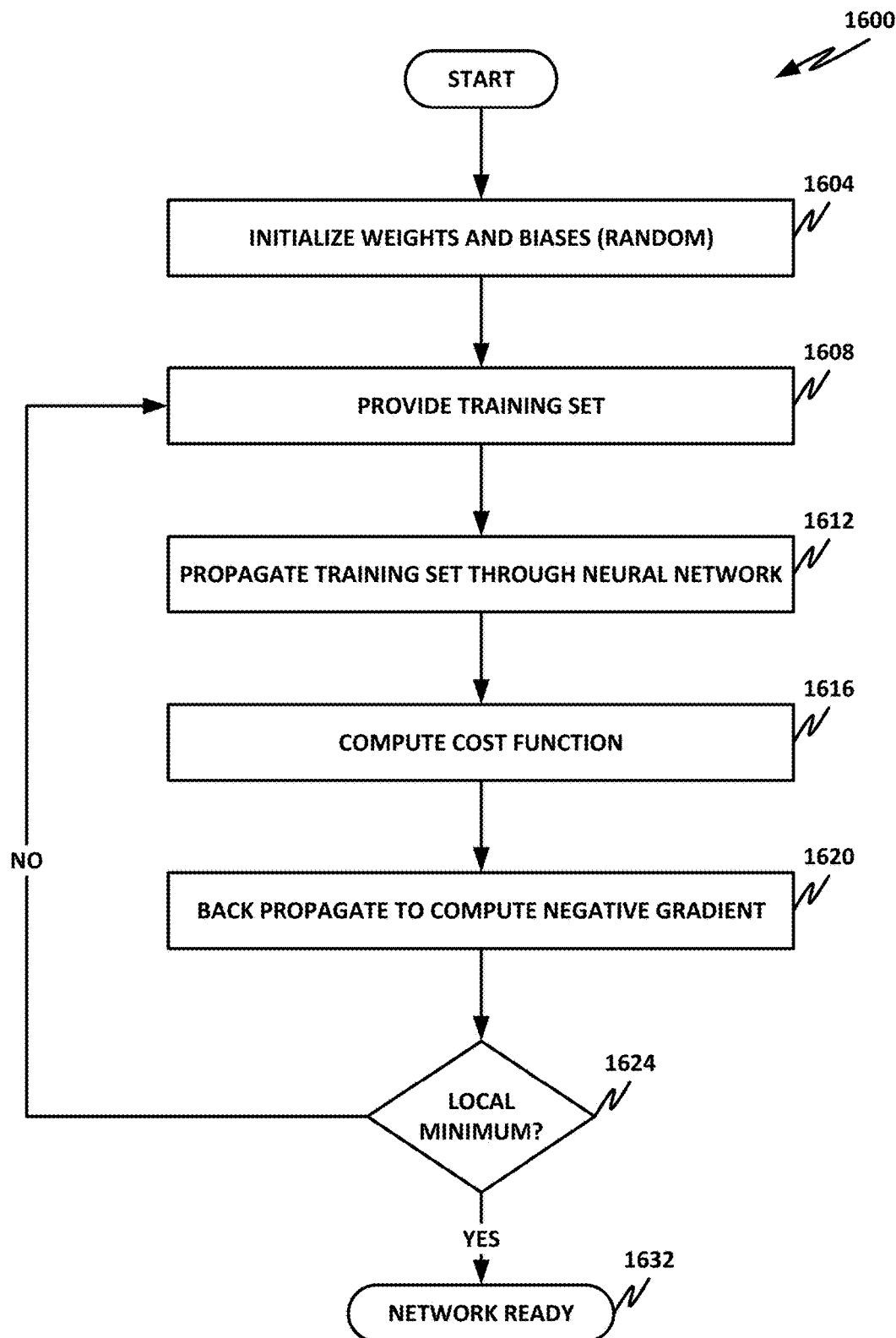
FIG. 16 is a flowchart of a method that may be used to train a neural network.
Figure 17:
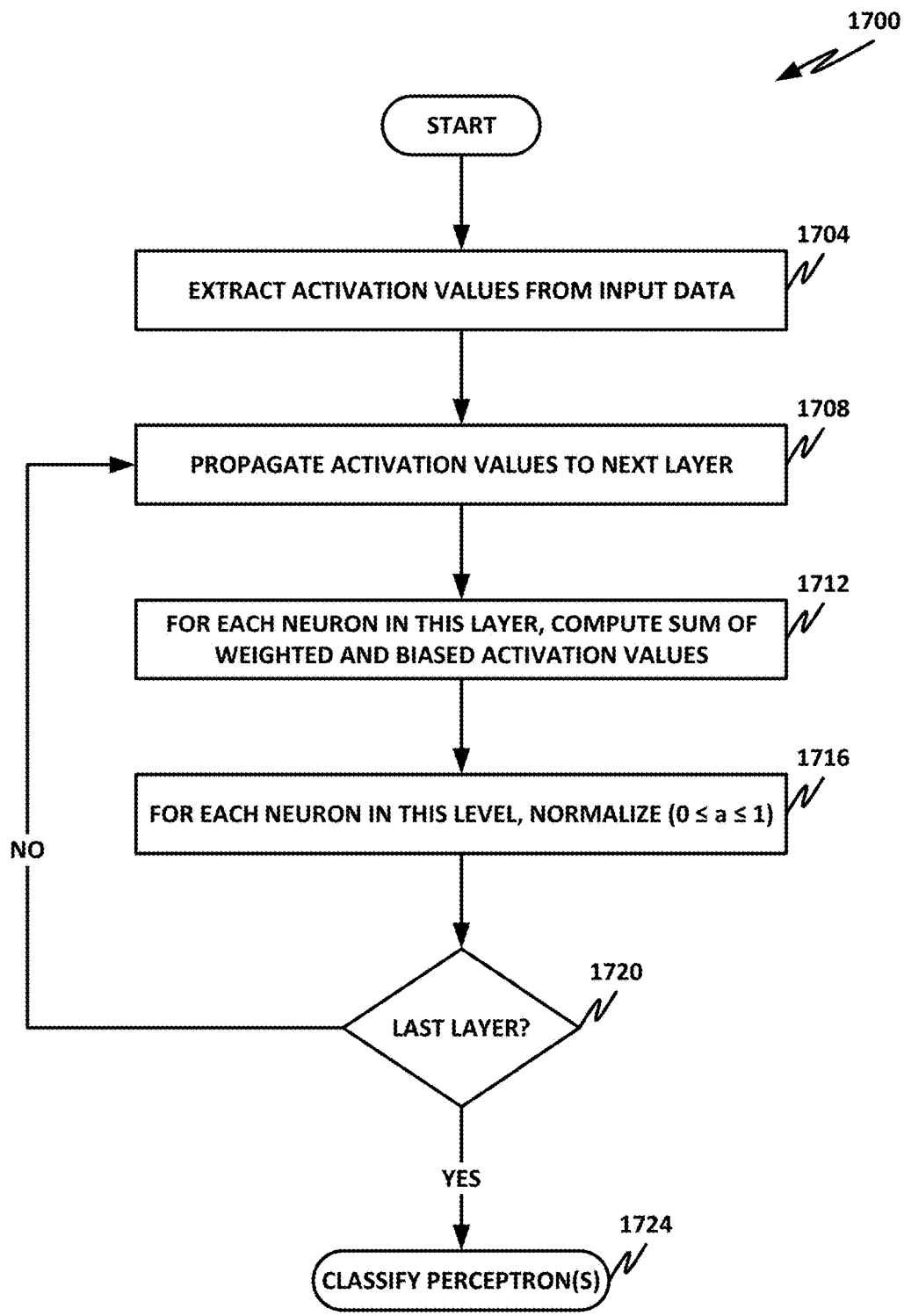
FIG. 17 is a flowchart of a method of using a neural network to classify an object.

FIGS. 15-17 illustrate selected elements of an artificial intelligence system or architecture. In these FIGURES, an elementary neural network is used as a representative embodiment of an artificial intelligence or machine learning architecture or engine. This should be understood to be a nonlimiting example, and other machine learning or artificial intelligence architectures are available, including for example symbolic learning, robotics, computer vision, pattern recognition, statistical learning, speech recognition, natural language processing, deep learning, convolutional neural networks, recurrent neural networks, object recognition and/or others.

FIG. 15 illustrates machine learning according to a "textbook" problem with real-world applications. In this case, a neural network 1500 is tasked with recognizing characters.

To simplify the description, neural network 1500 is tasked only with recognizing single digits in the range of 0 through 9. These are provided as an input image 1504. In this example, input image 1504 is a 28×28-pixel 8-bit grayscale image. In other words, input image 1504 is a square that is 28 pixels wide and 28 pixels high. Each pixel has a value between 0 and 255, with 0 representing white or no color, and 255 representing black or full color, with values in between representing various shades of gray. This provides a straightforward problem space to illustrate the operative principles of a neural network. It should be understood that only selected elements of neural network 1500 are illustrated in this FIGURE, and that real-world applications may be more complex, and may include additional features. Additional layers of complexity or functions may be provided in a neural network, or other artificial intelligence architecture, to meet the demands of a particular problem. Indeed, the architecture here is sometimes referred to as the "Hello World" problem of machine learning, and is provided here as but one example of how the machine learning or artificial intelligence functions of the present specification could be implemented.

In this case, neural network 1500 includes an input layer 1512 and an output layer 1520. In principle, input layer 1512 receives an input such as input image 1504, and at output layer 1520, neural network 1500 "lights up" a perceptron that indicates which character neural network 1500 thinks is represented by input image 1504.

Between input layer 1512 and output layer 1520 are some number of hidden layers 1516. The number of hidden layers 1516 will depend on the problem to be solved, the available compute resources, and other design factors. In general, the more hidden layers 1516, and the more neurons per hidden layer, the more accurate the neural network 1500 may become. However, adding hidden layers and neurons also increases the complexity of the neural network, and its demand on compute resources. Thus, some design skill is required to determine the appropriate number of hidden layers 1516, and how many neurons are to be represented in each hidden layer 1516.

Input layer 1512 includes, in this example, 784 "neurons" 1508. Each neuron of input layer 1512 receives information from a single pixel of input image 1504. Because input image 1504 is a 28×28 grayscale image, it has 784 pixels. Thus, each neuron in input layer 1512 holds 8 bits of information, taken from a pixel of input layer 1504. This 8-bit value is the "activation" value for that neuron.

Each neuron in input layer 1512 has a connection to each neuron in the first hidden layer in the network. In this example, the first hidden layer has neurons labeled 0 through M. Each of the M+1 neurons is connected to all 784 neurons in input layer 1512. Each neuron in hidden layer 1516 includes a kernel or transfer function, which is described in greater detail below. The kernel or transfer function determines how much "weight" to assign each connection from input layer 1512. In other words, a neuron in hidden layer 1516 may think that some pixels are more important to its function than other pixels. Based on this transfer function, each neuron computes an activation value for itself, which may be for example a decimal number between 0 and 1.

Each neuron in this layer is also connected to each neuron in the next layer, which has neurons from 0 to N. As in the previous layer, each neuron has a transfer function that assigns a particular weight to each of its M+1 connections, and computes its own activation value. In this manner, values are propagated along hidden layers 1516, until they reach the last layer, which has P+1 neurons labeled 0 through P. Each of these P+1 neurons has a connection to each neuron in output layer 1520. Output layer 1520 includes a number of neurons known as perceptrons that compute an activation value based on their weighted connections to each neuron in the last hidden layer 1516. The final activation value computed at output layer 1520 may be thought of as a "probability" that input image 1504 is the value represented by the perceptron. For example, if neural network 1500 operates perfectly, then perceptron 4 would have a value of 1.00, while each other perceptron would have a value of 0.00. This would represent a theoretically perfect detection. In practice, detection is not generally expected to be perfect, but it is desirable for perceptron 4 to have a value close to 1, while the other perceptrons have a value close to 0.

Conceptually, neurons in the hidden layers 1516 may correspond to "features." For example, in the case of computer vision, the task of recognizing a character may be divided into recognizing features such as the loops, lines, curves, or other features that make up the character. Recognizing each loop, line, curve, etc., may be further divided into recognizing smaller elements (e.g., line or curve segments) that make up that feature. Moving through the hidden layers from left to right, it is often expected and desired that each layer recognizes the "building blocks" that make up the features for the next layer. In practice, realizing this effect is itself a nontrivial problem, and may require greater sophistication in programming and training than is fairly represented in this simplified example.

The activation value for neurons in the input layer is simply the value taken from the corresponding pixel in the bitmap. The activation value ($\alpha$) for each neuron in succeeding layers is computed according to a transfer function, which accounts for the "strength" of each of its connections to each neuron in the previous layer. The transfer can be written as a sum of weighted inputs (i.e., the activation value ($\alpha$) received from each neuron in the previous layer, multiplied by a weight representing the strength of the neuron-to-neuron connection (w)), plus a bias value.

The weights may be used, for example, to "select" a region of interest in the pixmap that corresponds to a "feature" that the neuron represents. Positive weights may be used to select the region, with a higher positive magnitude representing a greater probability that a pixel in that region (if the activation value comes from the input layer) or a subfeature (if the activation value comes from a hidden layer) corresponds to the feature. Negative weights may be used for example to actively "de-select" surrounding areas or subfeatures (e.g., to mask out lighter values on the edge), which may be used for example to clean up noise on the edge of the feature. Pixels or subfeatures far removed from the feature may have for example a weight of zero, meaning those pixels should not contribute to examination of the feature.

The bias (b) may be used to set a "threshold" for detecting the feature. For example, a large negative bias indicates that the "feature" should be detected only if it is strongly detected, while a large positive bias makes the feature much easier to detect.

The biased weighted sum yields a number with an arbitrary sign and magnitude. This real number can then be normalized to a final value between 0 and 1, representing (conceptually) a probability that the feature this neuron represents was detected from the inputs received from the previous layer. Normalization may include a function such as a step function, a sigmoid, a piecewise linear function, a Gaussian distribution, a linear function or regression, or the popular "rectified linear unit" (ReLU) function. In the examples of this specification, a sigmoid function notation ($\sigma$) is used by way of illustrative example, but it should be understood to stand for any normalization function or algorithm used to compute a final activation value in a neural network.

The transfer function for each neuron in a layer yields a scalar value. For example, the activation value for neuron "0" in layer "1" (the first hidden layer), may be written as:

$$a_0^{(1)} = \sigma(w_0 a_0^{(0)} + w_1 a_1^{(0)} + \ldots w_{783} a_{783}^{(0)} + b)$$

In this case, it is assumed that layer 0 (input layer 1512) has 784 neurons. Where the previous layer has "n" neurons, the function can be generalized as:

$$a_0^{(1)} = \sigma(w_0 a_0^{(0)} + w_1 a_1^{(0)} + \ldots w_n a_n^{(0)} + b)$$

A similar function is used to compute the activation value of each neuron in layer 1 (the first hidden layer), weighted with that neuron's strength of connections to each neuron in layer 0, and biased with some threshold value. As discussed above, the sigmoid function shown here is intended to stand for any function that normalizes the output to a value between 0 and 1.

The full transfer function for layer 1 (with k neurons in layer 1) may be written in matrix notation as:

$$a^{(1)} = \sigma\left(\begin{bmatrix} w_{0,0} & \cdots & w_{0,n} \\ \vdots & \ddots & \vdots \\ w_{(k,0)} & \cdots & w_{k,n} \end{bmatrix} \begin{bmatrix} a_0^{(0)} \\ \vdots \\ a_n^{(0)} \end{bmatrix} + \begin{bmatrix} b_0 \\ \vdots \\ b_n \end{bmatrix}\right)$$

More compactly, the full transfer function for layer 1 can be written in vector notation as:

$$a^{(1)} = \sigma(Wa^{(0)} + b)$$

Neural connections and activation values are propagated throughout the hidden layers 1516 of the network in this way, until the network reaches output layer 1520. At output layer 1520, each neuron is a "bucket" or classification, with the activation value representing a probability that the input object should be classified to that perceptron. The classifications may be mutually exclusive or multinominal. For example, in the computer vision example of character recognition, a character may best be assigned only one value, or in other words, a single character is not expected to be simultaneously both a "4" and a "9." In that case, the neurons in output layer 1520 are binomial perceptrons. Ideally, only one value is above the threshold, causing the perceptron to metaphorically "light up," and that value is selected. In the case where multiple perceptrons "light up," the one with the highest probability may be selected. The final result is that only one value (in this case, "4") should be "lit up," while the rest should be "dark." Indeed, if the neural network were perfect, the "4" neuron would have an activation value of 1.00, while each other neuron would have an activation value of 0.00.

In the case of multinominal perceptrons, more than one output may be "lit up." For example, a neural network may determine that a particular document has high activation values for perceptrons corresponding to several departments, such as Accounting, Information Technology (IT), and Human Resources. On the other hand, the activation values for perceptrons for Legal, Manufacturing, and Shipping are low. In the case of multinominal classification, a threshold may be defined, and any neuron in the output layer with a probability above the threshold may be considered a "match" (e.g., the document is relevant to those departments). Those below the threshold are considered not a match (e.g., the document is not relevant to those departments).

The weights and biases of the neural network act as parameters, or "controls," wherein features in a previous layer are detected and recognized. When the neural network is first initialized, the weights and biases may be assigned randomly or pseudo-randomly. Thus, because the weights and biases controls are garbage, the initial output is expected to be garbage. In the case of a "supervised" learning algorithm, the network is refined by providing a "training" set, which includes a number of objects with known results. Because the "right" answer for each object is known, training sets can be used to iteratively move the weights and biases away from garbage values, and toward more useful values.

A common method for refining values includes "gradient descent" and "back-propagation." An illustrative gradient descent method includes computing a "cost" function, which measures the error in the network. For example, in the illustration, the "4" perceptron ideally has a value of "1.00," while the other perceptrons have an ideal value of "0.00." The cost function takes the difference between each output and its ideal value, squares the difference, and then takes a sum of all of the differences. Each training example will have its own computed cost. Initially, the cost function is very large, because the network doesn't know how to classify objects. As the network is trained and refined, the cost function value is expected to get smaller, as the weights and biases are adjusted toward more useful values.

With, for example, 100,000 training examples in play, an average cost (e.g., a mathematical mean) can be computed across all 100,00 training examples. This average cost provides a quantitative measurement of how "badly" the neural network is doing its detection job.

The cost function can thus be thought of as a single, very complicated formula, where the inputs are the parameters (weights and biases) of the network. Because the network may have thousands or even millions of parameters, the cost function has thousands or millions of input variables. The output is a single value representing a quantitative measurement of the error of the network. The cost function can be represented as:

$$C(w)$$

Wherein w is a vector containing all of the parameters (weights and biases) in the network. The minimum (absolute and/or local) can then be represented as a trivial calculus problem, namely:

$$\frac{dC}{dw}(w) = 0$$

Solving such a problem symbolically may be prohibitive, and in some cases not even possible, even with heavy computing power available. Rather, neural networks commonly solve the minimizing problem numerically. For example, the network can compute the slope of the cost function at any given point, and then shift by some small amount depending on whether the slope is positive or negative. The magnitude of the adjustment may depend on the magnitude of the slope. For example, when the slope is large, it is expected that the local minimum is "far away," so larger adjustments are made. As the slope lessens, smaller adjustments are made to avoid badly overshooting the local minimum. In terms of multi-vector calculus, this is a gradient function of many variables:

$$-\nabla C(w)$$

The value of $-\nabla C$ is simply a vector of the same number of variables as w, indicating which direction is "down" for this multivariable cost function. For each value in $-\nabla C$, the sign of each scalar tells the network which "direction" the value needs to be nudged, and the magnitude of each scalar can be used to infer which values are most "important" to change.

Gradient descent involves computing the gradient function, taking a small step in the "downhill" direction of the gradient (with the magnitude of the step depending on the magnitude of the gradient), and then repeating until a local minimum has been found within a threshold.

While finding a local minimum is relatively straightforward once the value of $-\nabla C$, finding an absolutely minimum is many times harder, particularly when the function has thousands or millions of variables. Thus, common neural networks consider a local minimum to be "good enough," with adjustments possible if the local minimum yields unacceptable results. Because the cost function is ultimately an average "error" value over the entire training set, minimizing the cost function yields a (locally) lowest average error.

In many cases, the most difficult part of gradient descent is computing the value of $-\nabla C$. As mentioned above, computing this symbolically or exactly would be prohibitively difficult. A more practical method is to use "back-propagation" to numerically approximate a value for $-\nabla C$. Back-propagation may include, for example, examining an individual perceptron at the output layer, and determining an average cost value for that perceptron across the whole training set. Taking the "4" perceptron as an example, if the input image is a 4, it is desirable for the perceptron to have a value of 1.00, and for any input images that are not a 4, it is desirable to have a value of 0.00. Thus, an overall or average desired adjustment for the "4" perceptron can be computed.

However, the perceptron value is not hard-coded, but rather depends on the activation values received from the previous layer. The parameters of the perceptron itself (weights and bias) can be adjusted, but it may also be desirable to receive different activation values from the previous layer. For example, where larger activation values are received from the previous layer, the weight is multiplied by a larger value, and thus has a larger effect on the final activation value of the perceptron. The perceptron essentially "wishes" that certain activations from the previous layer were larger or smaller. Those "wishes" can be back-propagated to the previous layer neurons.

At the next layer, the neuron takes into account the "wishes" from the next downstream layer in determining its own "preferred" activation value. Again, at this layer, the activation values are not hard-coded. Each neuron can adjust its own weights and biases, and then back-propagate changes to the activation values that it "wishes" would occur. The back-propagation continues, layer by layer, until the weights and biases of the first hidden layer are set. This layer cannot back-propagate desired changes to the input layer, because the input layer receives activation values directly from the input image.

After a round of "nudging," the network may receive another round of training with the same or a different training data set, and the process is repeated until a local and/or global minimum value is found for the cost function.

FIG. 16 is a flowchart of a method 1600. Method 1600 may be used to train a neural network, such as neural network 1500 of FIG. 15.

In block 1604, the network is initialized. Initially, neural network 1500 includes some number of neurons. Each neuron includes a transfer function or kernel. In the case of a neural network, each neuron includes parameters such as the weighted sum of values of each neuron from the previous layer, plus a bias. The final value of the neuron may be normalized to a value between 0 and 1, using a function such as the sigmoid or ReLU. Because the untrained neural network knows nothing about its problem space, and because it would be very difficult to manually program the neural network to perform the desired function, the parameters for each neuron may initially be set to just some random value. For example, the values may be selected using a pseudorandom number generator of a CPU, and then assigned to each neuron.

In block 1608, the neural network is provided a training set. In some cases, the training set may be divided up into smaller groups. For example, if the training set has 100,000 objects, this may be divided into 1,000 groups, each having 100 objects. These groups can then be used to incrementally train the neural network. In block 1608, the initial training set is provided to the neural network. Alternatively, the full training set could be used in each iteration.

In block 1612, the training data are propagated through the neural network. Because the initial values are random, and are therefore essentially garbage, it is expected that the output will also be a garbage value. In other words, if neural network 1500 of FIG. 15 has not been trained, when input image 1504 is fed into the neural network, it is not expected with the first training set that output layer 1520 will light up perceptron 4. Rather, the perceptrons may have values that are all over the map, with no clear winner, and with very little relation to the number 4.

In block 1616, a cost function is computed as described above. For example, in neural network 1500, it is desired for perceptron 4 to have a value of 1.00, and for each other perceptron to have a value of 0.00. The difference between the desired value and the actual output value is computed and squared. Individual cost functions can be computed for each training input, and the total cost function for the network can be computed as an average of the individual cost functions.

In block 1620, the network may then compute a negative gradient of this cost function to seek a local minimum value of the cost function, or in other words, the error. For example, the system may use back-propagation to seek a negative gradient numerically. After computing the negative gradient, the network may adjust parameters (weights and biases) by some amount in the "downward" direction of the negative gradient.

After computing the negative gradient, in decision block 1624, the system determines whether it has reached a local minimum (e.g., whether the gradient has reached 0 within the threshold). If the local minimum has not been reached, then the neural network has not been adequately trained, and control returns to block 1608 with a new training set. The training sequence continues until, in block 1624, a local minimum has been reached.

Now that a local minimum has been reached and the corrections have been back-propagated, in block 1632, the neural network is ready.

FIG. 17 is a flowchart of a method 1700. Method 1700 illustrates a method of using a neural network, such as network 1500 of FIG. 15, to classify an object.

In block 1704, the network extracts the activation values from the input data. For example, in the example of FIG. 15, each pixel in input image 1504 is assigned as an activation value to a neuron 1508 in input layer 1512.

In block 1708, the network propagates the activation values from the current layer to the next layer in the neural network. For example, after activation values have been extracted from the input image, those values may be propagated to the first hidden layer of the network.

In block 1712, for each neuron in the current layer, the neuron computes a sum of weighted and biased activation values received from each neuron in the previous layer. For example, in the illustration of FIG. 15, neuron 0 of the first hidden layer is connected to each neuron in input layer 1512. A sum of weighted values is computed from those activation values, and a bias is applied.

In block 1716, for each neuron in the current layer, the network normalizes the activation values by applying a function such as sigmoid, ReLU, or some other function.

In decision block 1720, the network determines whether it has reached the last layer in the network. If this is not the last layer, then control passes back to block 1708, where the activation values in this layer are propagated to the next layer.

Returning to decision block 1720, If the network is at the last layer, then the neurons in this layer are perceptrons that provide final output values for the object. In terminal 1724, the perceptrons are classified and used as output values.

Figure 18:
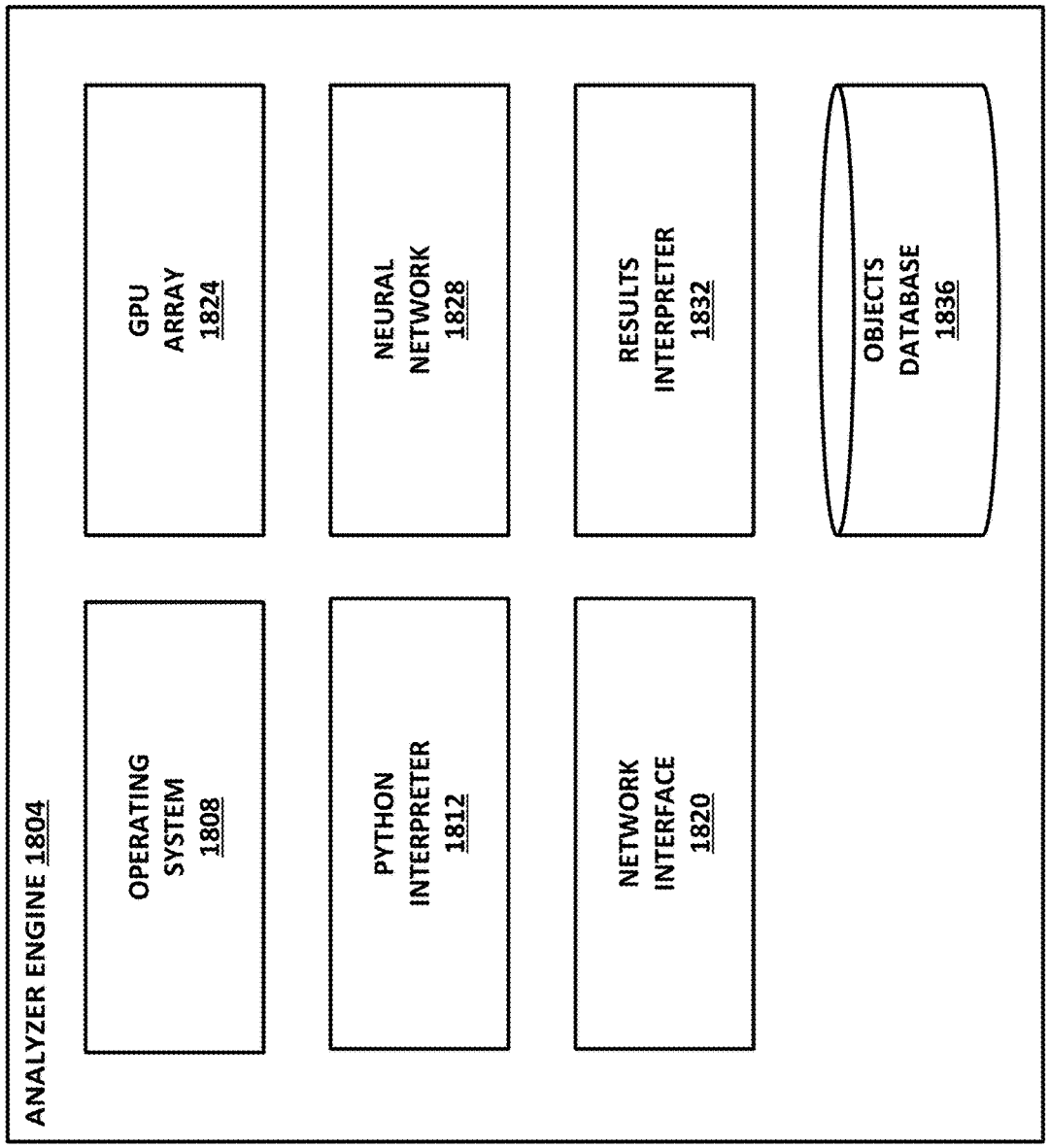
FIG. 18 is a block diagram illustrating selected elements of an analyzer engine.

FIG. 18 is a block diagram illustrating selected elements of an analyzer engine 1804. Analyzer engine 1804 may be configured to provide analysis services, such as via a neural network. FIG. 18 illustrates a platform for providing analysis services. Analysis, such as neural analysis and other machine learning models, may be used in some embodiments to provide one or more features of the present disclosure.

Note that analyzer engine 1804 is illustrated here as a single modular object, but in some cases, different aspects of analyzer engine 1804 could be provided by separate hardware, or by separate guests (e.g., virtual machines or containers) on a hardware system.

Analyzer engine 1804 includes an operating system 1808. Commonly, operating system 1808 is a Linux operating system, although other operating systems, such as Microsoft Windows, Mac OS X, or similar could be used. Analyzer engine 1804 also includes a Python interpreter 1812, which can be used to run Python programs. A Python module known as Numerical Python (NumPy) is often used for neural network analysis. Although this is a popular choice, other non-Python or non-NumPy-based systems could also be used. For example, the neural network could be implemented in Matrix Laboratory (MATLAB), C, C++, Fortran, R, or some other compiled or interpreted computer language.

GPU array 1824 may include an array of graphics processing units that may be used to carry out the neural network functions of neural network 1828. Note that GPU arrays are a popular choice for this kind of processing, but neural networks can also be implemented in CPUs, or in ASICs or FPGAs that are specially designed to implement the neural network.

Neural network 1828 includes the actual code for carrying out the neural network, and as mentioned above, is commonly programmed in Python.

Results interpreter 1832 may include logic separate from the neural network functions that can be used to operate on the outputs of the neural network to assign the object for particular classification, perform additional analysis, and/or provide a recommended remedial action.

Objects database 1836 may include a database of known malware objects and their classifications. Neural network 1828 may initially be trained on objects within objects database 1836, and as new objects are identified, objects database 1836 may be updated with the results of additional neural network analysis.

Once final results have been obtained, the results may be sent to an appropriate destination via network interface 1820.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile random access memory (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computing apparatus, comprising:
a hardware platform comprising a processor circuit and a memory; and
instructions encoded within the memory to instruct the processor circuit to:
receive, from a first remote computing device, a client event report, the client event report including an operating system event trace for an attempt to exploit a vulnerability on the first remote computing device that is patched against the vulnerability, and first feature data for a malware object that made the attempt;
receive, from a second remote computing device, a request for a reputation for an unknown object different from the malware object, the request comprising second feature data for the unknown object that attempted to exploit the vulnerability on the second remote computing device that is not patched against the vulnerability;
compare the first feature data to the second feature data;
based on determining that the second feature data match the first feature data above a threshold, convict the unknown object as malware; and
provide a malware reputation for the unknown object and instruct the second remote computing device to mitigate the unknown object.

2. The computing apparatus of claim 1, wherein the instructions provide a container.

3. The computing apparatus of claim 1, wherein the instructions provide a virtual machine, including a virtual processor.

4. The computing apparatus of claim 1, wherein the instructions are further to determine that the second feature data do not match the first feature data above the threshold, and to mark the unknown object for additional analysis.

5. The computing apparatus of claim 1, wherein the first and second feature data comprise static features.

6. The computing apparatus of claim 1, wherein the first and second feature data comprise dynamic analysis features.

7. The computing apparatus of claim 1, wherein the instructions are further to provide an artificial intelligence engine.

8. The computing apparatus of claim 7, wherein the second feature data comprise an image file derived from the unknown object.

9. The computing apparatus of claim 1, wherein the second feature data comprise a binary image of the unknown object.

10. The computing apparatus of claim 1, wherein the instructions are to receive the first feature data for a set of a plurality of known objects, and the second feature data for a set of unknown objects.

11. The computing apparatus of claim 10, wherein comparing the first feature data to the second feature data comprises querying a MinHash locality sensitive hashing forest based on Jaccard-compatible features, and selecting a subset of most-similar samples by computing a total distance from non-Jaccard-compatible sub-distances.

12. One or more tangible, non-transitory computer-readable storage media having stored thereon executable instructions to:
   allocate, by a server, a first data store and populate the first data store with first feature data for a first plurality of objects reported by a first set of remote computing devices convicted as malware according to attempts of the first plurality of objects to exploit security vulnerabilities on the first set of remote computing devices patched against the security vulnerabilities;
   allocate, by the server, a second data store and populate the second data store with second feature data for a second plurality of objects with unknown reputations that attempted to exploit the security vulnerabilities on a second set of remote computing devices not patched against the security vulnerabilities, wherein the second plurality of objects are from the second set of remote computing devices; and
   assign, by the server, reputations to the second plurality of objects according to similarity of the second plurality of objects to individual objects selected from the first plurality of objects; and
   provide, by the server, the second set of remote computing devices with respective one or more assigned reputations for the second plurality of objects and instruct, by the server, the second set of remote computing devices to mitigate the second plurality of objects.

13. The one or more tangible, non-transitory computer-readable storage media of claim 12, wherein the executable instructions are further to determine that the second feature data do not match the first feature data above a threshold for at least some of the second plurality of objects, and to mark the at least some of the second plurality of objects with unknown reputations for additional analysis.

14. The one or more tangible, non-transitory computer-readable storage media of claim 12, wherein the first and second feature data comprise static features.

15. The one or more tangible, non-transitory computer-readable storage media of claim 12, wherein the first and second feature data comprise dynamic analysis features.

16. The one or more tangible, non-transitory computer-readable storage media of claim 12, wherein the executable instructions are further to provide an artificial intelligence engine.

17. The one or more tangible, non-transitory computer-readable storage media of claim 16, wherein the second feature data comprise an image file derived from the objects.

18. A computer-implemented method of analyzing a set of unknown binary objects, comprising:
   convicting, by a server, a first set of objects reported by a first set of endpoint devices as malware according to attempts of the first set of objects to exploit vulnerabilities on the first set of endpoint devices patched against the vulnerabilities;
   collecting, by the server, first feature data for the first set of objects in a first data store;
   collecting, by the server, second feature data for a second set of unknown objects received from a second set of endpoint devices that have requested reputations for the second set of unknown objects that attempted to exploit the vulnerabilities on the second set of endpoint devices not patched against the vulnerabilities;
   for the second set of unknown objects, finding, by the server, a most-similar object in the first set of objects, and assigning, by the server, reputations to objects from the second set of unknown objects according to a degree of similarity to the first set of objects; and
   providing, by the server, the assigned reputations to the second set of endpoint devices and instructing, by the server, the second set of endpoint devices to mitigate the objects.

19. The method of claim 18, further comprising receiving first feature data for a set of a plurality of known objects, and second feature data for a set of unknown objects.

20. The method of claim 19, wherein finding a most-similar object comprises querying a MinHash locality sensitive hashing forest based on Jaccard-compatible features, and selecting a subset of most-similar samples by computing a total distance from non-Jaccard-compatible sub-distances.

* * * * *